United States Patent [19]
Forkert

[11] Patent Number: 6,159,327
[45] Date of Patent: *Dec. 12, 2000

[54] APPARATUS AND METHOD FOR APPLYING HEAT BONDABLE LAMINA TO A SUBSTRATE

[75] Inventor: Maurice J. Forkert, Fort Wayne, Ind.

[73] Assignee: Polaroid Corporation, Cambridge, Mass.

[ * ] Notice: This patent is subject to a terminal disclaimer.

[21] Appl. No.: 09/075,088

[22] Filed: May 8, 1998

Related U.S. Application Data

[60] Continuation-in-part of application No. 08/993,270, Dec. 18, 1997, Pat. No. 6,007,660, which is a division of application No. 08/630,681, Sep. 12, 1996, Pat. No. 5,783,024.

[51] Int. Cl.[7] .............................. B32B 31/04; B32B 35/00
[52] U.S. Cl. .................. 156/264; 156/256; 156/263; 156/351; 156/354; 156/364; 156/521; 156/555; 156/556
[58] Field of Search ................................ 156/256, 264, 156/351, 353, 354, 355, 362, 378, 364, 517, 519, 521, 555, 556, 64, 308.2, 263

[56] References Cited

U.S. PATENT DOCUMENTS

| | | |
|---|---|---|
| 4,021,288 | 5/1977 | Hannon et al. . |
| 4,025,380 | 5/1977 | Bernardo ................................ 156/355 |
| 4,268,345 | 5/1981 | Semchuck . |
| 4,505,772 | 3/1985 | Renz ...................................... 156/355 |
| 4,519,865 | 5/1985 | Bradler et al. ......................... 156/256 |
| 4,619,728 | 10/1986 | Brink . |
| 4,680,079 | 7/1987 | Tanaka . |
| 4,702,789 | 10/1987 | Ceraso ................................... 156/256 |
| 5,688,738 | 11/1997 | Lu .......................................... 503/227 |
| 5,783,024 | 7/1998 | Forkert .................................. 156/351 |
| 5,788,806 | 8/1998 | Bradshaw et al. . |
| 6,007,660 | 12/1999 | Forkert .................................. 156/256 |

FOREIGN PATENT DOCUMENTS

| | | |
|---|---|---|
| 222 446 A2 | 12/1982 | European Pat. Off. . |
| 153 547 A1 | 2/1984 | European Pat. Off. . |
| WO 89/07517 | 8/1989 | European Pat. Off. . |
| 788 085 A1 | 8/1996 | European Pat. Off. . |
| 835 739 A2 | 4/1998 | European Pat. Off. . |
| 33 34 009 A1 | 9/1983 | Germany . |

OTHER PUBLICATIONS

Pct International Search Report, PCT/US 99/08833, Apr. 12, 1999.

*Primary Examiner*—Curtis Mayes
*Attorney, Agent, or Firm*—Barry Gaiman

[57] ABSTRACT

Apparatus and method for making a plurality of substrates laminated on two sides by applying a plurality of laminate sheets to corresponding plurality of substrates. The apparatus includes a lamina supply member capable of holding a supply of lamina from which successive sheets of lamina can be cut. One or more cutters are disposed in the apparatus such that the cutters are capable of cutting through the lamina to provide successive sheets of laminate. One or more heaters are provided for bonding sheets of laminate to corresponding sides of a substrate whereby the corresponding top and bottom laminated substrate is formed. The supply of lamina is characterized by a current leading edge. The supply of lamina is cut through along a cutting line at a predetermined distance from the current leading edge of the lamina. This provides a first sheet of laminate having a trailing edge at the cutting line. Cutting also provides the lamina supply with a successive leading edge at the cutting line. There is substantially no wasted lamina material between the trailing edge of the laminate sheet and the successive leading edge of the lamina. The laminate sheets are then bonded to the top and bottom sides of a corresponding substrate. The steps of cutting the lamina along a cutting line and bonding the resultant laminate sheets to the top and bottom sides of a corresponding substrate are repeated a plurality of times to yield the plurality of laminated substrates.

37 Claims, 15 Drawing Sheets

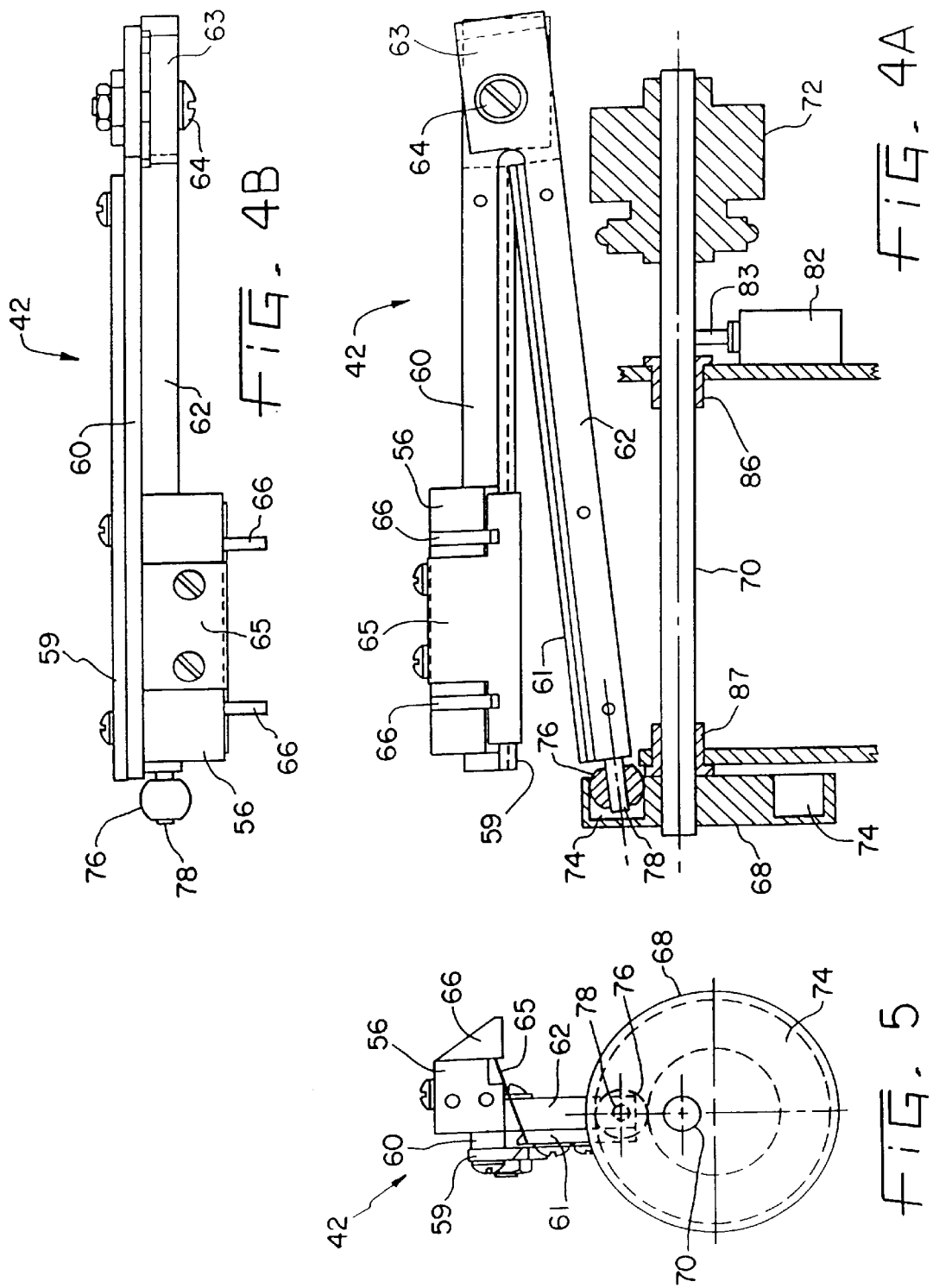

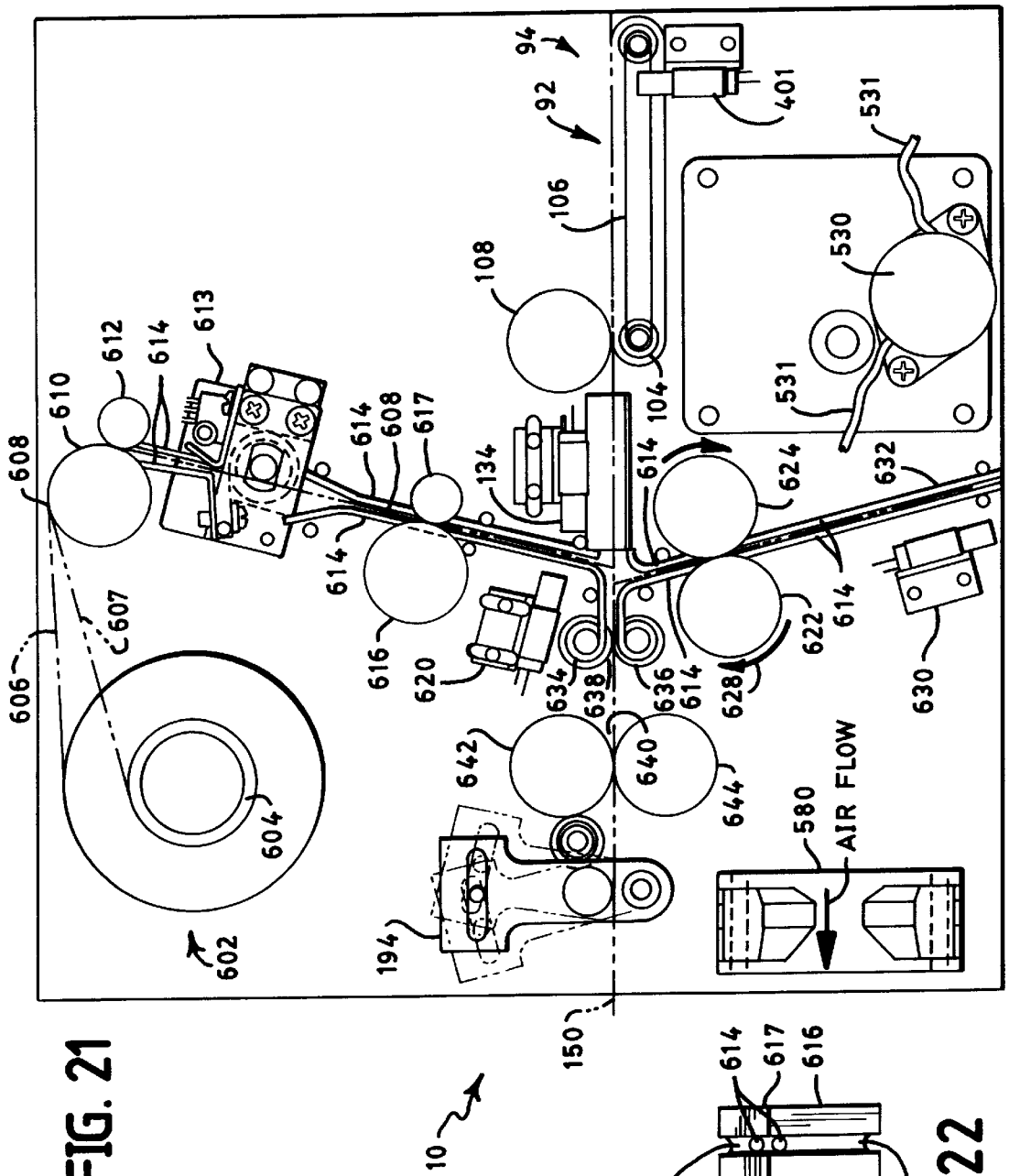

APPARATUS AND METHOD FOR APPLYING HEAT BONDABLE LAMINA TO A SUBSTRATE

CROSS REFERENCE TO RELATED APPLICATIONS

This is a continuation-in-part of application Ser. No. 08/993,270 filed Dec. 18, 1997 now U.S. Pat. No. 6,007,660, which is a division of application Ser. No. 08/630,681, filed Sep. 12, 1996 now U.S. Pat. No 5,783,024.

FIELD OF THE INVENTION

The present invention relates to a method and apparatus for making laminated cards. More particularly, the present invention relates to a method and apparatus for laminating a plurality of heat bondable laminate sheets to a corresponding plurality of card substrates.

BACKGROUND OF THE INVENTION

Laminated cards are widely used as certificates of citizenship, employee identification cards, passports, driver's licenses, transaction cards, and other applications of a similar nature in which such cards establish a person's authorization to conduct certain activities. Laminated cards typically comprise a card-shaped substrate made from a suitable material such as paper, cardboard, or plastic. Information such as photographs, data, textual information, graphics, or the like, may be printed on one or both sides of the cards. In some applications, information may also be optically or magnetically stored on recording media provided within or on the surfaces of such cards.

In view of the widespread use of laminated cards, it is important that the information provided with the cards be protected against damage. It is also important that the information be protected against unauthorized alterations. Accordingly, the information provided on the substrate may be covered by a protective plastic laminate sheet which is bonded to the substrate. Most commonly, heat-activated adhesives are used to accomplish such bonding.

When printed information on the substrate is protected by a plastic laminate sheet, the plastic sheet would have to be removed from the substrate in order to alter the printed information and then subsequently replaced after the alteration has been completed. To protect against this activity, the plastic sheet may include an authentication image of a type which is destroyed when the plastic film is removed, such as a holographic image, ultraviolet image, an image formed with pearlescent ink, a chemical patch, and the like. In an alternative approach, the authentication image is substantially invisible until the plastic is removed, after which the image becomes permanently visible. In either approach, the change in the state of the image indicates that the plastic film has been removed from the substrate. This, in turn, suggests that the printed information on the substrate may have been altered.

A number of different approaches have been used to laminate heat bondable plastic laminate sheets to card substrates, but such approaches which have been used for manufacturing large quantities of laminated cards tend to generate a substantial amount of waste material. For example, according to a "decal" approach, a 2 to 3 micron thick, heat transferrable, plastic laminate material is supported upon a carrier web. To apply the laminate material to the substrate, the substrate and the laminate material are brought into contact, and then the laminate material is transferred to the card using heat. This approach does not work too well, because the 2 to 3 micron thick coating is too thin to adequately protect the card against scratches and ultraviolet bleaching. Additionally, the left-over carrier web becomes scrap which must be thrown away. Additionally, left-over, and hence wasted, laminate material remains on the carrier web in between the transferred areas.

According to a "die-cut" approach, a much thicker laminate material is supported upon a carrier web. With the laminate material being supported upon the carrier web, a plurality of individual, spaced-apart laminate sheets are die-cut in the laminate material in a manner such that the carrier web itself is not cut at all, or at least is not cut entirely through. After die-cutting, the excess laminate material between the spaced-apart sheets is removed from the web and thrown away as scrap, thus leaving only the spaced apart, die cut sheets on the web. The individual sheets must be spaced apart relative to each other when using this approach in order to allow registration marks to be placed on the material in the unused regions between the sheets. The registration marks are used to register the sheets on corresponding substrates. Each successive die-cut sheet is then bonded to a corresponding substrate using a heater. The individual sheets must also be spaced apart in order to allow the carrier web to be pulled away from the heater after bonding in order to bring the next sheet into position for bonding to the next substrate. Like the process described above with respect to the 2 to 3 micron thick laminate material, the left-over carrier web from this approach also becomes scrap which must be thrown away.

An approach is needed which allows high volumes of laminated substrates to be fabricated without generating so much waste.

SUMMARY OF THE INVENTION

The present invention provides methods and apparatus for making laminated substrates, such as laminated cards, in which substantially no laminate material is wasted. Preferred embodiments of the present invention use one or more supply rolls of lamina from which successive sheets of laminate are cut. Advantageously, no carrier web is required, i.e. the supply of lamina is webless, and no scrap laminate material is generated except for the couple of inches or less of lamina material remaining at the end of a supply roll when the supply runs out.

The present invention is also quite versatile. Many varieties of card substrates and lamina material of varying type, nature, thickness, size, etc., can be effectively laminated together using the present invention. Additionally, both sides of the substrate can be laminated in one pass of the substrate through the apparatus of the present invention. The present invention can also be set up for fully automatic operation or for hand-fed operation, as desired.

As still another advantage, the present invention allows laminate sheets to be accurately, reliably, and repeatedly placed in proper registration on corresponding substrates without any need for registration marks. Whereas prior art approaches require placement of registration marks in scrap areas of laminate materials in order to achieve proper registration, the present invention requires none, and indeed could not use such marks, because the present invention has no scrap. As noted above, substantially all of the laminate material used in the method and apparatus of the present invention is used.

In one aspect, the advantages of the present invention are provided by an apparatus suitable for making a plurality of laminated substrates by applying a plurality of laminate sheets to corresponding plurality of substrates. The apparatus includes a lamina supply member capable of holding a supply of lamina from which successive sheets of lamina can be cut. A cutter is disposed in the apparatus such that the cutter is capable of cutting through the lamina to provide said successive sheets of laminate. A heater is provided for bonding each successive sheet of laminate to a corresponding substrate whereby the corresponding laminated substrate is formed.

Another aspect of the present invention concerns a process for making a plurality of laminated substrates. According to this aspect of the present invention, a supply of lamina is provided from which a successive plurality of laminate sheets are cut. The supply of lamina is characterized by a current leading edge. The supply of lamina is cut through along a cutting line at a predetermined distance from the current leading edge of the lamina. This provides a first sheet of laminate having a trailing edge at the cutting line. Cutting also provides the lamina supply with a successive leading edge at the cutting line. There is substantially no wasted lamina material between the trailing edge of the laminate sheet and the successive leading edge of the lamina. The laminate sheet is then bonded to a corresponding substrate. The steps of cutting the lamina along a cutting line and bonding the resultant lamina sheet to a corresponding substrate are repeated a plurality of times to yield the plurality of laminated substrates.

Another aspect of the present invention concerns an apparatus for automatically laminating top and bottom sides of the substrate. According to this aspect of the present invention, the apparatus comprises a lamina supply route with a cutter disposed along the supply route. The cutter is capable of cutting lamina into successive sheets of lamina. A lamina conveyor is disposed along the lamina supply route for transporting lamina and successive lamina sheets. A substrate path having an entry and an exit is provided and a substrate conveyor is disposed along the substrate path. The substrate conveyor is capable of transporting the substrate from the entry to the exit. The lamina supply route connects to the substrate path in a convergence zone, the top side of the substrate being brought into registration with a first cut sheet of lamina in the convergence zone, and the bottom side of the substrate being brought into registration with a second cut sheet of laminate in the convergence zone. The substrate path includes a bonding station in which the first cut sheet of lamina is bonded to the top size of the substrate whereas the second cut sheet of lamina is bonded to the bottom side of the substrate. Along the substrate path, the convergence zone follows the entry, the bonding station follows the convergence zone, and the exit follows the bonding station. Thus, the top and bottom of the substrate can both be laminated during a single pass of the substrate along the substrate path.

Yet another aspect of the present invention concerns a process for making a plurality of laminated cards laminated on their top and bottom sides. According to this aspect of the present invention, a supply of lamina is provided from which a successive plurality of laminate sheets are cut. The supply of lamina is characterized by a current leading edge. The supply of lamina is cut through along a cutting line at a predetermined distance from the current leading edge of the lamina. This provides a first sheet of laminate having a trailing edge at the cutting line. Cutting also provides the lamina supply with a successive leading edge at the cutting line. There is substantially no wasted lamina material between the trailing edge of the laminate sheet and the successive leading edge of the lamina. The first laminate sheet is then bonded to a first side of a substrate card. The step of cutting through the lamina along a cutting line is repeated with either the same or an additional supply of lamina to provide a second sheet of laminate. Then the second sheet of laminate is bonded to a second side of the first substrate card. The preceding steps can then be repeated a plurality of times to yield a plurality of laminated cards.

Yet another advantage of the present invention is that it provides the ability to laminate a substrate on both sides in a single pass of the substrate through the apparatus. By contrast, a slower and undesirable prior art approach involves conveying the substrate through the apparatus a first time to laminate one side of the substrate, and then conveying the substrate through the apparatus a second time to laminate the other side of the substrate. Furthermore, such a double pass approach requires flipping the substrate card over between the first and second pass of the substrate through the apparatus.

Another advantage of the double sided laminating apparatus of the present invention is that it can laminate both sides of a substrate card more quickly than a substrate card can be printed by currently available printers. Thus, when printing and laminating a plurality of substrate cards, the present invention does not limit the speed at which the substrate cards can be printed and laminated. Instead, the speed of the entire process is limited by the speed at which the cards can be printed because as noted, the present invention is faster than currently available card printers.

Yet another advantage of the double sided laminating apparatus of the present invention is its versatility. The apparatus of the present invention is capable of housing two supplies of laminate material so that different types of laminate material can be used for laminating the top and bottom surfaces of the substrate. For example, a substrate card may have a magnetic strip on its bottom side and require a laminate sheet covering only part of the bottom side. The top side may require complete coverage including a holographic, optical, or UV image. With the present invention, the substrate card can be laminated with different widths and characteristics of laminate material on its top and bottom sides in a single pass of the substrate through the apparatus.

BRIEF DESCRIPTION OF THE DRAWINGS

The above-mentioned and other features and advantages of this invention, and the manner of attaining them, will become more apparent and the invention will be better understood by reference to the following description of the invention taken in conjunction with the accompanying drawings, wherein:

FIG. 4a side view of a pair of motor driven scissors used in the assembly of FIG. 1 with some parts shown in cross section;

FIG. 4b is a top view of the scissors of FIG. 4a with some parts removed for clarity;

FIG. 5 is an end view of the scissors of FIG. 4a with parts removed to more clearly show the blade cam whose rotation opens and closes the scissors;

FIG. 21 is a plan view showing a third embodiment of a lamina processing assembly in accordance with the present invention;

FIG. 22 is a side elevational view of a conveyor roller pair in accordance with the present invention;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
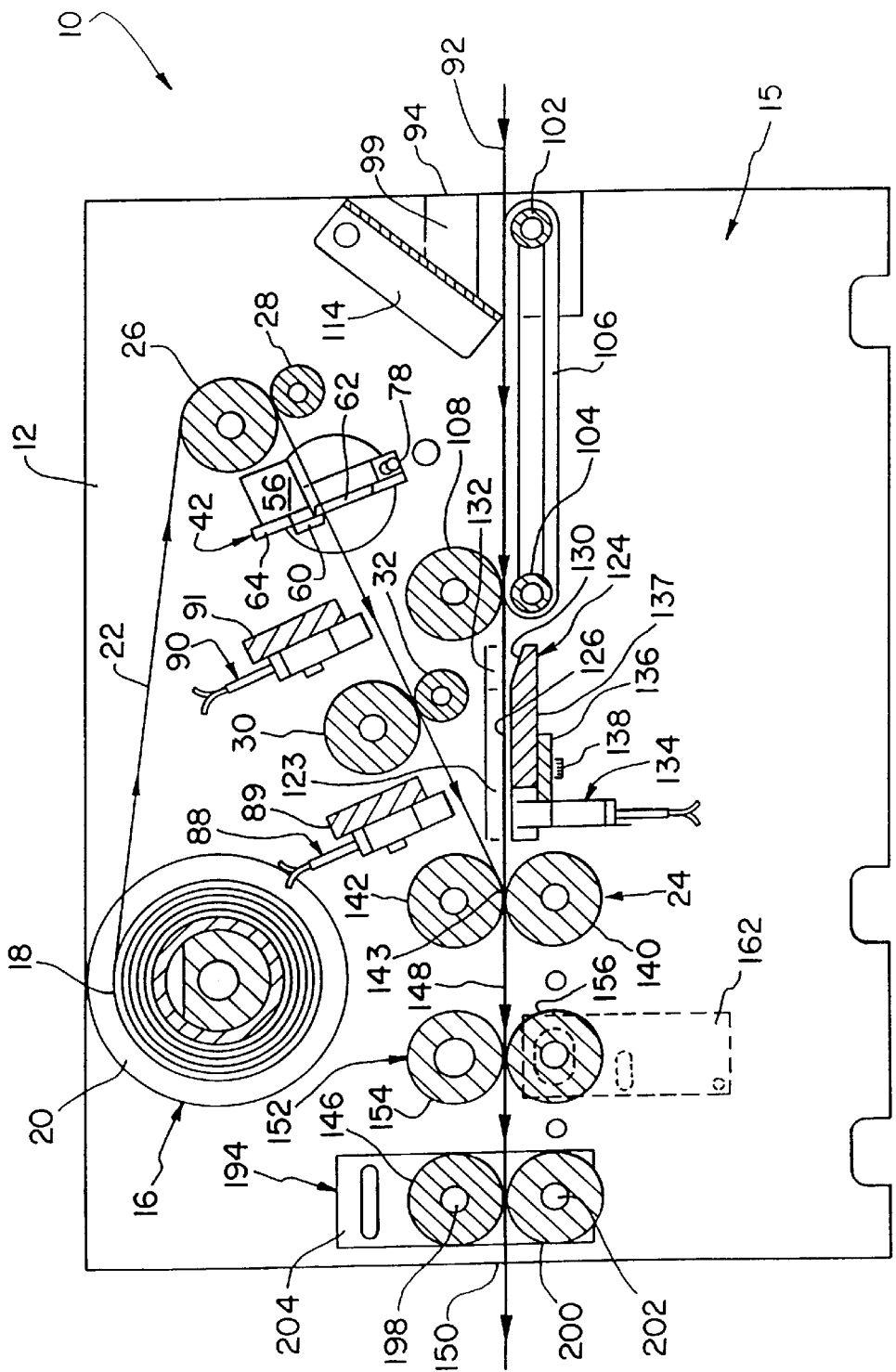
FIG. 1 is a plan view showing a lamina processing assembly of the present invention.

The various aspects of the present invention will now be described with reference to the particular laminating apparatus 10 shown in the figures. However, the description disclosed below are not intended to be exhaustive or to limit the invention to the precise forms disclosed in the following detailed description.

The apparatus 10 comprises a support structure containing a front housing wall 11 (part of which is shown only in FIGS. 6 and 7) and a rear housing wall which for purposes of clarity is not shown in the drawings. Middle housing wall 12 is disposed between the front housing wall and the rear housing wall and divides apparatus 10 into two main chambers. First chamber 13 houses gear and sprocket drive train, generally designated 14 in FIG. 2. The second chamber 15 houses the lamina processing assembly, generally designated 16 in FIG. 1.

The lamina processing assembly 16 includes a lamina supply member 20 on which a supply roll of heat bondable lamina 18 is rotatably stored. A wide variety of heat bondable lamina materials may be used in the practice of the present invention. Representative examples of suitable lamina material include "TBSN" lamina material available from TransilWrap and "H12-V" lamina material available from the Minnesota Mining and Manufacturing Company (3M). Alternatively, ultraviolet activated adhesive laminate or sticky adhesive type laminate could be used, without the use of heaters.

A lamina supply path 22 extends from lamina supply member 20 to convergence zone 24. Optionally, a sensor (not shown) of any suitable type may be disposed on lamina supply path 22 proximal to supply member 20 in order to detect when the supply of lamina 18 runs out. Lamina supply path 22 passes between a first set of corresponding pinch rollers 26 and 28 and a second set of corresponding pinch rollers 30 and 32. First set of pinch rollers 26 and 28 are disposed on the lamina supply path 22 at a position which is upstream relative to a cutter which is generally designated 42. Second set of pinch rollers 30 and 32 are located on the lamina supply path 22 at a position which is downstream relative to the cutter 42.

The apparatus could also include a laminate which includes a machine readable indicia, readable by the laminating apparatus, to check that the correct laminate material is used with the machine. If the material is incorrect, the apparatus could signal the absence of correct material. Such machine readable indicia on laminate material could be ultraviolet ink, infrared markings, or other markings not visible to the human eye.

First set of pinch rollers 26 and 28 are rotatably driven by clutch-driven gear and sprocket assembly 34 and idler gear 36, respectively. In a similar fashion, second set of pinch rollers 30 and 32 are driven by clutch-driven gear and sprocket assembly 38 and idler gear 40, respectively. The rotation of the gear and sprocket assemblies 34 and 38 and idler gears 36 and 40 causes pinch rollers 26, 30, 28 and 32 to correspondingly rotate. Rotation of these rollers, in turn, causes transport of lamina 18 along lamina supply path 22. Desirably, wire guides (not shown for purpose of clarity) may be disposed along the top and bottom of the lamina supply path 22 to help guide lamina 18.

Throughout this specification whenever mention is made of clutch driven gears, it should be understood that servo driven gears could also be used.

In the embodiment shown in FIGS. 1, 2 and 6–8, cutter 42 is a pair of motor-driven scissors. Referring now to FIGS. 1, 3a and 3b in particular, cutter/scissors 42 is disposed on the lamina supply path 22 for cutting the supply of lamina 18 along cutting line 44 at a predetermined distance d, from leading edge 46 of lamina 18. Cutting of lamina 18 along cutting line 44 provides heat bondable laminate sheet 48 having the same leading edge 46, but a newly provided trailing edge 50 at the cutting line 44. Cutting of lamina 18 along cutting line 44 also provides the supply roll of lamina 18 with a successive leading edge 52. The remaining portion of lamina 18 may then be cut along successive cutting line 55 to provide the next sheet of laminate corresponding to the portion of lamina 18 between successive leading edge 52 and successive cutting line 55. Additional sheets of laminate can be successively cut from the remaining portions of lamina 18 in a similar fashion until the supply of lamina runs out.

Advantageously, in the practice of the present invention, a plurality of laminate sheets can be cut from lamina supply 18 with substantially no waste between the trailing edge of each cut sheet and the successive leading edge of the next laminate sheet. As a result, except for the couple of inches or less of material remaining at the end of a roll, the present invention generates no wasted lamina, in sharp contrast to the prior art approaches which waste significant amounts of material.

Referring in particular now to FIGS. 1, 2, 4a, 4b, and 5, scissors 42 is secured in apparatus 10 upon mounting block 56. Scissors 42 includes a top cutting blade 59 provided on a fixed top arm 60. Fixed top arm 60, in turn, is mounted to mounting block 56. A bottom cutting blade 61 is provided on a pivoting bottom arm 62. Pivoting bottom arm 62 includes a pivoting arm portion 63 which is pivotably coupled to blade pivot 64. Bottom cutting blade 61 can thus pivot about the blade pivot 64 from an open position as shown in the Figures to a closed position at which the bottom cutting blade 61 cuttingly engages top cutting blade 59. When bottom cutting blade 61 is in the open position, lamina supply path 22 passes between top cutting blade 59 and bottom cutting blade 61. When the supply of lamina 18 is conveyed along lamina supply path 22 between blades 60 and 62, bottom cutting blade 61 closes and then opens to cut the lamina with a scissor type action.

Advantageously, lamina spring 65 is disposed on mounting block 56 to help bias the lamina 18 downward away from the fixed cutting blade 59 as the leading edge of the lamina 18 is guided through scissors 42. In the absence of lamina spring 65, the leading edge of lamina 18 may tend to jam against the upstream side of the top cutting blade 59 and/or the fixed top arm 60. Lamina spring 65 is desirably fabricated from a resiliently flexible material such as a metal, metal alloy, thermoplastic or thermoset polymer, and the like. Specific examples of suitable materials would include polycarbonate, polyurethane, polyester, copper, bronze, stainless steel, and aluminum or an aluminum alloy.

Fingers 66 project backwards from mounting block 56 and fit into corresponding grooves (not shown) in roller 26. Fingers 66 help prevent lamina 18 from wrapping upward around roller 26 as the leading edge of lamina 18 is guided past roller 26.

In the embodiment shown, scissors 42 is motor-driven. To accomplish this, clutch-controlled sprocket assembly 72 rotatably drives blade cam shaft 70 which, in turn, rotatably drives blade cam 68. Blade cam shaft 70 is rotatably journalled upon bearings 86 and 87 which are provided in apertures of auxiliary housing wall 58 and middle housing wall 12. Blade cam 68 includes ball track 74 for retaining cam follower 76. Finger 78, provided at the end of pivoting bottom arm 62, couples pivoting bottom arm 62 to cam follower 76. Rotatable blade cam 68 is eccentrically mounted on blade camshaft 70 such that rotation of blade cam 68 causes the pivoting bottom cutting blade 62 to pivotally open and close about blade pivot 64. As seen best in FIG. 1, scissors 42 is oriented such that the cutting action of the scissors is substantially perpendicular to the lamina supply path 22.

Generally, one revolution of blade cam 68 closes and then opens bottom cutting blade 61. To control this cutting action so that scissors 42 cuts each laminate sheet only once, shaft 70 is provided with shaft rotary location pin 83. Once during each revolution of shaft 70, pin 83 contacts shaft location switch 82. Thus, at the beginning of a cutting stroke, pin 83 may be positioned so that pin 83 is in contact, or just past the point of contact if desired, with switch 83. Clutch controlled sprocket 72 is engaged to rotate shaft 70. At the end of one shaft revolution, scissors 42 will have closed and opened to cut a laminate sheet from lamina 18. Pin 83 contacts switch 82 again after one revolution of shaft 70 as well, and sprocket 72 is then disengaged.

In those embodiments in which the fixed cutting blade is provided on the upstream side of scissors 42 relative to the pivoting cutting blade, successive leading edges of lamina 18 may tend to stick to fixed cutting blade 59 and/or fixed top arm 60 after lamina 18 has been cut. As a result, it then becomes difficult to convey such successive leading edge past scissors 42. Therefore, according to the embodiment of the present invention shown in the Figures, the pivoting cutting blade 61 is disposed on the lamina supply path on the upstream side of scissors 42 relative to fixed cutting blade 59. Advantageously, successive leading edges of cut lamina 18 do not tend to stick to the scissors 42 after cutting when the pivoting blade 61 is located on the upstream side of scissors 42, because the opening action of the pivoting blade 61 tends to release the successive leading edges.

Whereas the instant invention describes an apparatus wherein a roll of laminate is cut into individual sheets in the apparatus, it is also possible that individual laminate sheets could be fed into the machine for bonding into a substrate. Instead of using a roll of laminate, individual sheets could be fed into the lamina path and placed in registry with a substrate for bonding thereto.

Referring now to FIG. 1 in particular, apparatus 10 includes sensor 88 provided on mounting block 89 along supply path 22 between scissors 42 and convergence zone 24 in order to detect when a predetermined reference on lamina 18 is at a predetermined distance from the cutting line of scissors 42. Such a reference may be any suitable feature of lamina 18 which can be detected by the sensor. Examples of such features include the leading edge of the lamina 18 as well as markings, such as authentication images, provided on the surface of lamina 18. In the particular embodiment shown in FIG. 1, sensor 88 is disposed at a predetermined distance from the cutting line of scissors 42 to detect each successive leading edge of the supply of lamina 18 as lamina 18 is conveyed along path 22. When sensor 88 detects each such leading edge, lamina 18 being conveyed is stopped, and scissors 42 is actuated to cut lamina 18. As this process is repeated, all of the resultant laminated sheets will have been cut to a substantially identical length corresponding to the distance between sensor 88 and the cutting line of scissors 42. Advantageously, this approach is extremely accurate, reliable, and repeatable.

For example, laminate sheets are used to laminate many kinds of ISO Standard CR-80 type cards. All such cards, within specification tolerances, are characterized by a width of 2⅛ inches (5.40 cm) and a length of 3⅜ inches (8.57 cm). By providing a supply of lamina having a width of 2 inches (5.08 cm), and by positioning sensor 88 at a predetermined distance of 3¼ inches (8.25 cm) from the cutting line of scissors 42, a plurality of sheets suitable for laminating such cards can be easily provided using apparatus 10 of the present invention.

In other applications, lamina supply 18 may bear a plurality of authentication images, such as holographic images or the like, which must be precisely positioned on each corresponding substrate. For example, drivers licenses of some states and countries include a holographic authentication image precisely positioned over portions of the photographic image and textual information included on such licenses. To use apparatus 10 to make a plurality of laminated sheets suitable for laminating such substrates, alternative embodiments of the invention may include sensor 90 disposed at a position on lamina supply path 22 suitable for detecting when the authentication reference, rather than the leading edge, of lamina 18 is at a predetermined distance from the cutting line of scissors 42. When sensor 90 detects each such authentication image, scissors 42 may then be actuated to cut the lamina 18. As this process is repeated, all of the resultant laminated sheets will have been cut to a substantially identical length in which the authentication image is precisely positioned on each such sheet. Sensor 90 may be mounted on mounting block 91.

In the practice of the present invention, sensors 88 and 90 used in apparatus 10 may be any type of sensor known in the art which would be suitable for detecting the predefined reference of the lamina. One example of a type of sensor found to be suitable in the practice of the present invention for this purpose is a standard reflective type LED sensor. Such sensors are reliable and accurate. Further, as known in the art, the reliability and accuracy of such sensors can be even further improved by placing a dull, black, nonreflective plate (not shown), or another nonreflective type of member, in opposition to such sensors in order reduce the tendency of such sensors to generate false detection signals.

Figure 2:
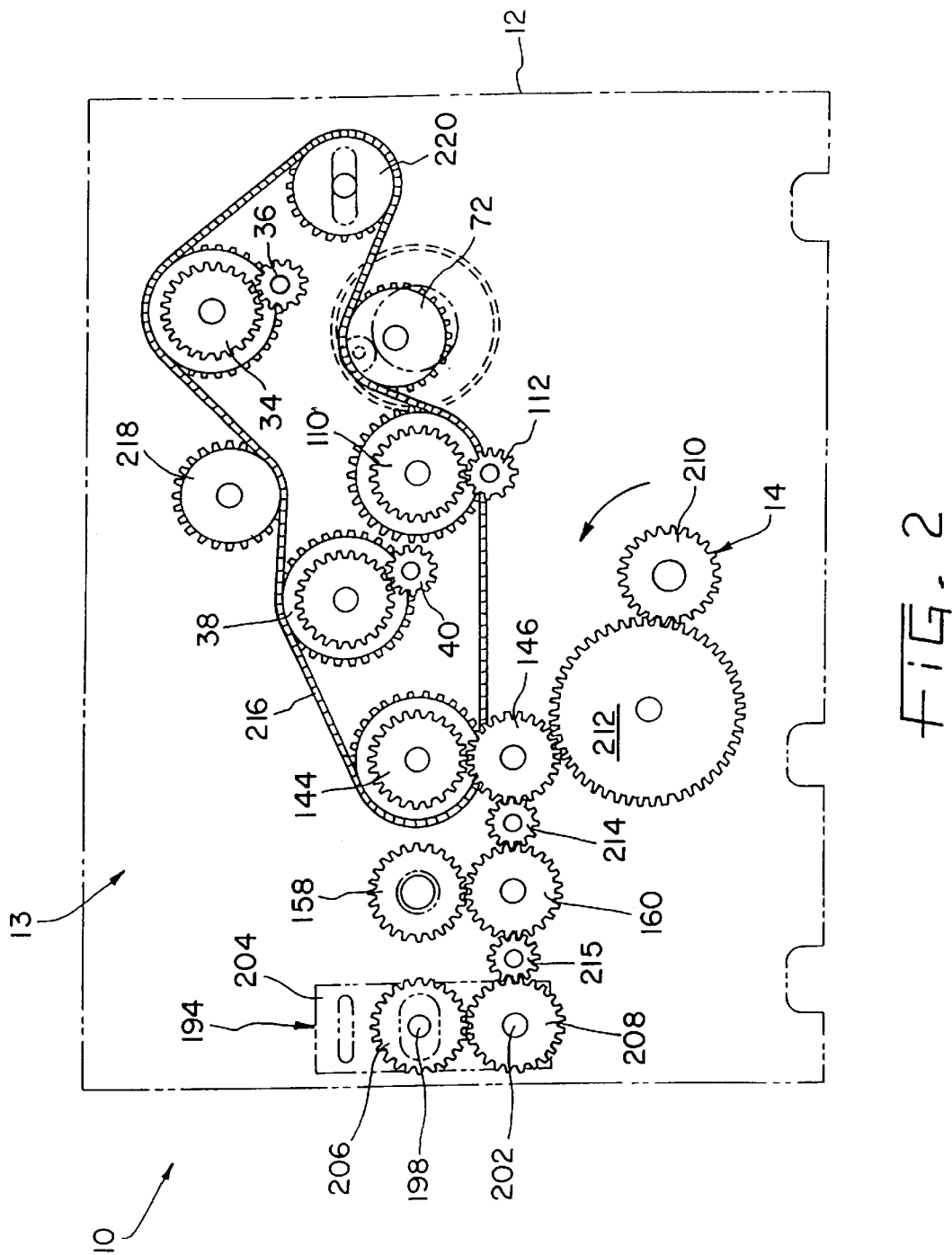
FIG. 2 is a gear drive train of the present invention corresponding to the lamina processing assembly of FIG. 1.
Figure 3A:
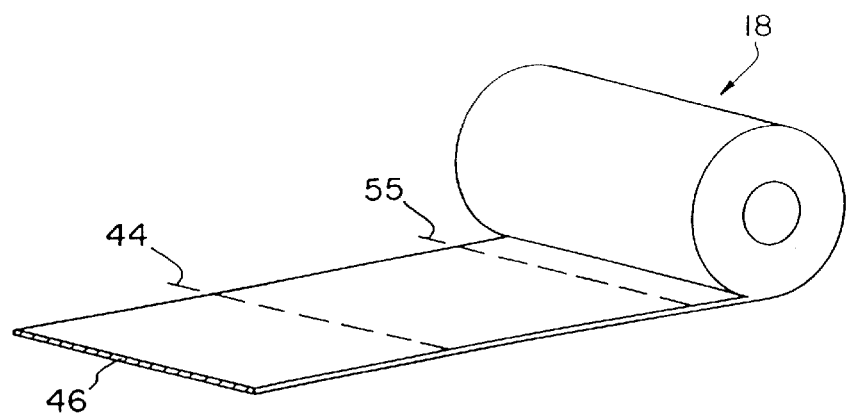
FIG. 3a is a schematic perspective view of a supply roll of lamina suitable for use in the practice of the present invention.
Figure 3B:
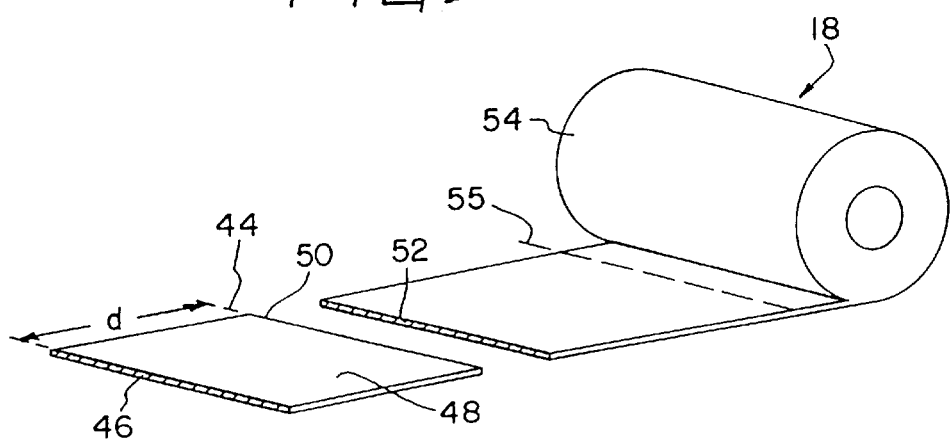
FIG. 3b is a schematic perspective view of the supply roll of lamina of FIG. 3a after a laminate sheet has been cut from the roll.
Figure 6:
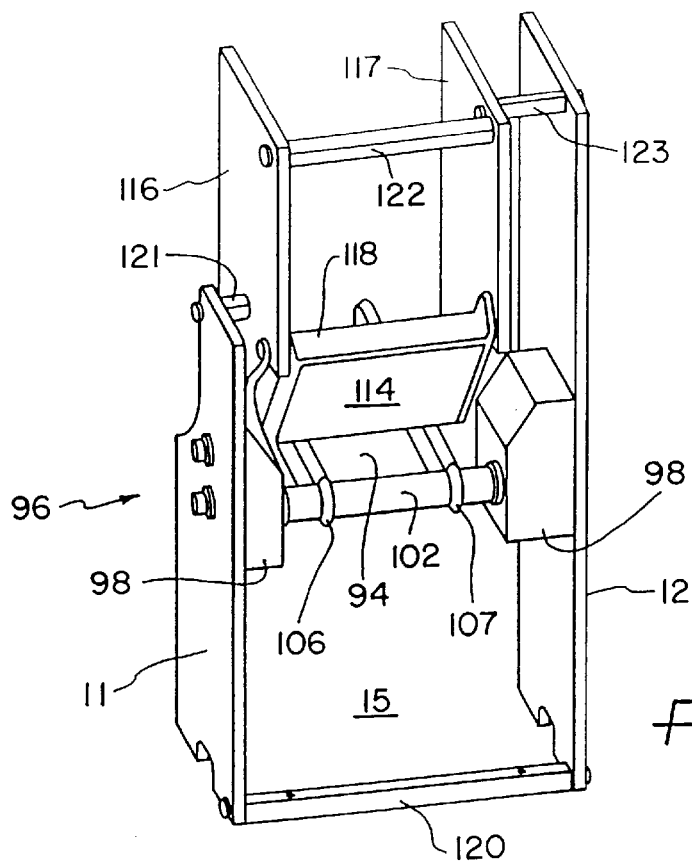
FIG. 6 is a perspective view showing the portion of the apparatus near the substrate entry zone of the lamina processing assembly of FIG. 1.

Referring now to FIGS. 1, 2 and 6, apparatus 10 includes a substrate supply path 92 extending from substrate entry zone 94 to convergence zone 24. A substrate guiding device, generally designated 96, is provided on substrate supply path 92 near substrate entry zone 94. Substrate guiding device 96 includes bevelled entry blocks 98 and 99 provided on each side of the substrate supply path 92. As seen best in FIG. 6, bevelled entry block 98 is mounted on front housing wall 11, and bevelled entry block 99 is mounted on middle housing wall 12. Above bevelled entry blocks 98 and 99, deflection plate 114 is pivotably disposed between auxiliary plates 116 and 117 on axle 118. Deflection plate 114 biases the substrates downward onto substrate supply path 92. A plurality of structural members, such as structural members 120, 121, 122 and 123, are provided in order to impart strength and rigidity to apparatus 10.

First conveyor roller 102 is rotatably supported between bevelled entry blocks 98 and 99. Further along the substrate supply path 92, path 92 passes between pinch roller 108 and second conveyor roller 104. A pair of endless loop drivers 106 and 107, are mounted around first conveyor roller 102 and second conveyor roller 104. Pinch roller 108 and second conveyor roller 104 are rotatably driven by clutch-controlled gear and sprocket assembly 110 and idler gear 112, respectively. Alternatively, servo motors could be used instead of clutch controlled gears. Rotation of second conveyor roller 104, in turn, causes rotation of endless loop drivers 106 and 107 about first conveyor roller 102 and second conveyor roller 104. Such rotation of endless loop drivers 106 and 107 causes transport of a substrate along that portion of substrate supply path 92 corresponding to endless loop drivers 106 and 107.

Support member 124 is provided for supporting the substrate along another portion of path 92 after the substrate is conveyed past pinch roller 108 and second conveyor roller 104. Support member 124 has a flat upper surface 126 providing a pathway which is slidably engaged by the substrate as the substrate is conveyed across support member 124. Support member 124 further includes a pair of sidewall members, one of which is shown as sidewall 128, to help constrain the substrate in position on upper surface 126. Upper surface 126 includes an entry bevel 130, and the sidewall members include entry bevels such as bevel 132, in order to ease entry of the substrate onto support member 124.

Sensor 134 is provided on the substrate supply path 92 and is mounted in position by fastening sensor flange 136 to the underside surface 137 of support member 124 with a suitable fastener, such as screw 138. Sensor 134 detects when a reference on the substrate is at a predetermined distance from the convergence zone 24. As was the case with lamina 18, the substrate reference may be any suitable feature of the substrate which can be detected by sensor 134. Examples of such features include the leading edge of the substrate as well as any markings, such as images or textual information, which may be provided on the substrate.

In the particular embodiment shown in the figures, the position of sensor 134 is coordinated with the position of sensor 88 so that the substrate and the laminate sheet, after the sheet has been cut from lamina 18, arrive at convergence zone 24 in a manner which allows the substrate and the laminate sheet to be brought together in proper registration. For example, the cut sheet of laminate and the substrate desirably arrive at the convergence zone 24 at substantially the same time while being conveyed at substantially the same speed along their respective paths. In such embodiments, the distance between convergence zone 24 and sensor 134 is substantially the same as the distance between convergence zone 24 and sensor 88.

In the practice of the present invention, sensor 134 may be any sensor known in the art which would be suitable for detecting the predefined reference of the substrate. As was the case with sensors 88 and 90, one example of a type of sensor found to be suitable in the practice of the present invention is a standard reflective type LED sensor. As was also the case with sensors 88 and 90, the performance of such a sensor can be improved by placing a dull, nonreflective, black plate (not shown), or another nonreflective type of member, in opposition to said sensor in order to reduce the tendency of such sensor to generate false detection signals. Due to the positioning of sensors 88 and 134, a single plate may be disposed between the two sensors in order to reduce such false detection incidents.

In convergence zone 24, the laminate sheet and substrate are registrably brought into contact to provide a sheet-bearing substrate. Convergence zone 24, as shown, comprises a pair of pinch rollers 140 and 142 which are rotatably driven by idler gear 146 and clutch driven gear and sprocket assembly 144, respectively. Lamina supply path 22 and substrate supply path 92 converge between pinch rollers 140 and 142 at convergence point 143 to form processing path 148, which extends from such point of convergence 143 to exit zone 150.

Heating apparatus 152 is disposed on processing path 148 for bonding the laminate sheet to a corresponding substrate. Heating apparatus 152 includes heated roller assembly 154 and corresponding pinch roller 156. Heated roller assembly 154 and pinch roller 156 are disposed on processing path 148 such that the laminate-bearing substrate is conveyed between heated roller assembly 154 and pinch roller 156 as the laminate bearing substrate is conveyed along the processing path. Pinch roller 156 is rotatably mounted on adjustment plate 162. Movement of adjustment plate 162 allows the distance between pinch roller 156 and heated roller assembly 154 to be changed in order to accommodate different thickness of substrates and laminates. Heated roller assembly 154 and pinch roller 156 are rotatably driven by gear 158 and gear 160, respectively. Together, heated roller assembly 154 and pinch roller press the laminate sheet and the substrate together as the heater applies heat for bonding.

Figure 7:
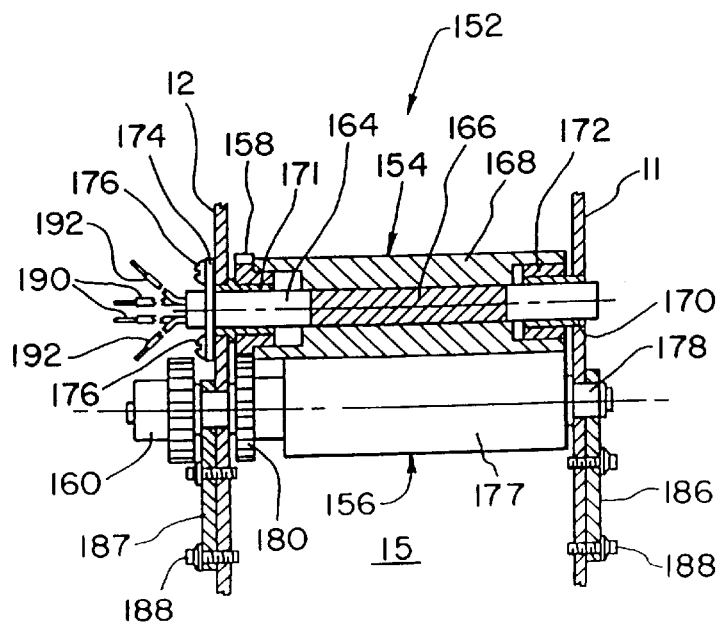
FIG. 7 is a side view of the heating apparatus used in the assembly of FIG. 1 with some parts shown in cross-section.
Figure 8:
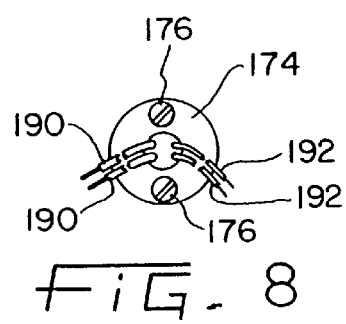
FIG. 8 is an end view of a portion of the heating apparatus of FIG. 7.

As shown best in FIGS. 7 and 8, heated roller assembly 500 includes a non-rotatable heater core 164 having a heated portion 166. Rotatable outer shell 168 is disposed on non-rotatable heater core 164 such that the non-rotatable heater core 164 heats rotatable outer shell 168. Rotatable outer shell 168, in turn, heatably bonds the laminate sheet to the substrate. Rotatable outer shell 168 is coupled to non-rotatable heater core 164 by any suitable bearing means which allows rotatable outer shell 168 to rotate freely about the non-rotatable heater core 164. As shown in the embodiment in FIG. 7, rotatable outer shell 168 is coupled to non-rotatable heater core 164 by inner pair of bearings 170 and 171 and outer pair of bearings including bearing 172 and the hub of gear 158 which serves as the other outer bearing. Gear 158 couples the heated roller assembly 154 to pinch roller 156.

In one mode of practicing the present invention, inner bearings 170 and 171 are non-rotatably coupled to the non-rotatable heater core 164. Additionally, outer bearing 172 and the hub of gear 158 are non-rotatably coupled to rotatable outer shell 168. Outer bearing 172 and the hub of gear 158, however, are fully rotatable about inner bearings 170 and 171. In order to reduce friction between the two sets of bearings, it is desirable that at least one set of such bearings comprises a self lubricating resin which is preferably polytetrafluorethylene. Polytetrafluorethylene is more commonly referred to by its trade designation "Teflon". For example, inner bearing 170 and the hub of gear 158 may be fabricated from Teflon brand resin and outer bearing 172 and gear 158 may be fabricated from stainless steel.

Heated roller assembly 154 is mounted between middle housing wall 12 and front housing wall 11. Middle housing wall 12 and front housing wall 11 desirably include apertures for receiving corresponding ends of non-rotatable heater core 164. Flange 174 is used to secure heated roller assembly 154 to the middle housing wall 12 using any suitable fastener, such as screws 176. Pinch roller 156 includes a roller body 177 and an axle 178. Axle 178 is rotatably received in corresponding apertures provided in middle housing wall 12 and front housing wall 11. Pinch roller 156 is secured in place by auxiliary plates 186 and 187 which are fastened to middle housing wall 12 and front housing wall 11 using any suitable fastener, such as screws 188. Pinch roller 156 is rotatably driven by gear 160. Gear 180 of pinch roller 156, in turn, rotatably drives gear 158 of heated roller assembly 154.

Energy for heating heated portion 166 of non-rotatable heater core 164 is provided to heated roller assembly 154 through heater wires 190. Thermocouple wires 192 are used to monitor the temperature of non-rotatable heater core 164. In order to maintain the non-rotatable heater core 164 at a desired temperature, the energy supply to heater wires 190 can be increased or decreased, as needed.

The process of using heat to bond the laminate sheet to the substrate can cause the resultant laminated substrate to bend, or "cargo" as such bending is sometimes called. Depending upon the materials used to fabricate the laminate sheet and the substrate, the face of the laminated substrate bearing the laminate sheet can be characterized by a convex or concave bend. It is desirable, therefore, to apply a reverse bend to the laminated substrate in order to remove such convex or concave bend.

Accordingly, as seen best in FIGS. 1 and 2, card straightener 194 is provided on processing path 148 for applying a reverse bend to the laminated substrate after the laminated substrate leaves heating apparatus 152. In the embodiments of the present invention as shown in the Figures, card straightener 194 is an assembly comprising a first pinch roller 196 having a center of rotation 198 and a second pinch roller 200 having a center of rotation 202. Pinch rollers 196 and 200 are rotatably mounted on adjustment plate 204 and are disposed on processing path 148 such that processing path 148 passes between rollers 196 and 200. A line extending from the center of rotation 198 to the center of rotation 202 defines a main axis of the card straightener 194. Adjustment plate 204 is pivotable about a pivot point so that the main axis of the card straightener 194 can be pivoted as well. Preferably, center of rotation 202 or 198, and more preferably center of rotation 202, serves as the pivot point for adjustment plate 204. Pinch rollers 196 and 200 are rotatably driven by gears 206 and 208, respectively.

Advantageously, because the main axis of card straightener is pivotable, card straightener 194 can be adjusted to provide a reverse convex or concave bend as desired. For example, in the embodiment in which center of rotation 202 serves as the pivot point for adjustment plate 204, pivoting of adjustment plate 204 toward the exit zone 150 causes the main axis of the card straightener 194 to pivot toward exit zone 150 as well. Such an orientation of the axis applies a reverse bend to the laminated substrate in which the leading edge of the laminated substrate is flexed downward. This is a useful approach for applying a reverse bend when the laminated substrate emerges from heating apparatus 142 in a condition in which the laminate sheet bearing side of the laminated substrate has a concave bend. On the other hand, pivoting of the adjustment plate 204 toward the heating apparatus 152 causes the main axis to pivot toward heating apparatus 152 as well. Such orientation of the main axis applies a reverse bend to the laminated substrate in which the leading edge of the laminated substrate is flexed upward by card straightener 194. This is a useful approach when the laminated substrate emerges from the heating apparatus 152 in a condition in which the laminate bearing side of the bottom laminated substrate has a convex bend.

Gear and sprocket drive train 14 will now be more fully described with particular reference to FIG. 2. Power from a motor (not shown) is transferred to drive train 14 through motor driven gear 210. To ensure that the various components of the drive train embodiment shown in FIG. 2 rotate in the proper direction, motor driven gear 210 rotates counter-clockwise and is coupled to the remainder of drive train 14 through large idler gear 212. Rotation of idler gear 212 rotatably drives gear 146. Rotational power of gear 146 is subsequently transferred to gear 160 and gear 208 through idler gears 214 and 215, respectively. Idler gears 214 and 215 not only transfer power to gears 160 and 208, but the use of idler gears 214 and 215 also ensures that gears 160 and 208 are rotating in the proper direction. Gears 160 and 208 rotatably drive gears 158 and 206, respectively.

Gear 146 also transfers rotational power to gear and sprocket assembly 144. Gear and sprocket assembly 144 is coupled, in turn, to clutch driven gear and sprocket assemblies 34, 38, and 110, as well as clutch driven sprocket 72, by timing belt 216. Clutch driven sprocket assemblies 34, 38, and 110, in turn, rotatably drive corresponding gears 36, 40, and 112. Drive train 14 further includes idler gear 218 which is disposed in drive train 14 in a manner to maintain engagement between timing belt 216 and clutch driven gear and sprocket assemblies 34 and 38. Adjustable belt tensioning sprocket 220 is also provided and can be moved to adjust the tension of timing belt 216, as desired. Advantageously, use of timing belt 216 causes gear and sprocket assemblies 34, 38, 110, and 144 all to rotate at substantially the same rotational speed so that the substrate and the laminate sheet are conveyed along their respective paths at substantially the same speed. The scissor sprocket 72 need not rotate at the same speed as such assemblies, and, in the embodiment shown, sprocket 72 is configured to rotate at a quicker speed than such assemblies.

One mode of operation of the apparatus shown in the Figures will now be described. Clutch driven gear and sprocket assemblies 34 and 38 are engaged to cause rotation of rollers 26, 28, 30, and 32. Rotation of these rollers causes the transport of lamina 18 along lamina supply path 22. When the leading edge of lamina 18 is detected by sensor 88 or sensor 90, as the case may be, clutch driven gear and sprocket assemblies 34 and 38 are disengaged and transport of lamina 18 stops. Scissors 42 is then actuated to cut through lamina 18 along a cutting line to provide a first cut sheet of heat bondable laminate.

After scissors 42 cuts the lamina 18, clutch driven sprocket and gear assembly 110 is engaged which, in turn, actuates rollers 108, 104, and 102 to convey a substrate along the substrate supply path 92. Engaging sprocket and gear assembly 110 only after the lamina 18 is cut helps make sure that a substrate is not fed into the apparatus 10 too soon. The substrate enters apparatus 10 through substrate entry zone 94. Substrate may be fed into apparatus 10 in any desired manner. For example, the substrate may be hand fed into apparatus 10 or alternatively, may be automatically fed into apparatus 10 directly from a suitable device, such as a printer. As the substrate enters apparatus 10, deflection plate 114 biases the substrate against endless loop drivers 106 and 107. To convey the substrate along substrate supply path 92, clutch driven gear and sprocket assembly 110 is engaged to rotatably drive pinch roller 108, first conveyor roller 102, second conveyor roller 104, and endless loop drivers 106 and 107.

When the substrate is conveyed far enough along the substrate supply path 92, sensor 134 will detect the presence of the substrate. When this happens, clutch driven gear and sprocket assembly 38 is engaged and both the substrate and the lamina sheet are conveyed between pinch rollers 140 and 142 at substantially the same time while being transported at substantially the same speed.

Meanwhile, rollers 140, 142, 154, 156, 196 and 200 are rotatably driven by corresponding components of gear drive train 14, and rotation of these rollers conveys the substrate and laminate along the processing path 148. As the laminated sheet and the substrate pass between pinch rollers 140 and 142, successive portions of the laminate sheet and the substrate are brought into contact. A laminate bearing substrate then emerges from between pinch rollers 140 and 142 and is next conveyed between heated roller assembly 154 and pinch roller 156. As the laminate sheet and the substrate are pressed together, heat from heated roller 154 activates the adhesive on the laminate sheet in order to bond the laminate sheet to the substrate. Given the characteristics of particular lamina 18 and substrate used, the laminated products produced may tend to be characterized either by a convex or concave bend. If this happens, card straightener 194 may be adjusted to apply an appropriate reverse bend to the laminated product before the laminated product leaves apparatus 10 through exit zone 150. Subsequent laminated products are formed from lamina 18 and additional substrates by repeating these operations.

Any conventional control mechanism can be used in the practice of the present invention to respond to sensor signals, actuate the scissors, and engage and disengage the clutch-controlled elements of the gear and sprocket drive-train 14. As one example, apparatus may include a microprocessor which controls such functions. As an additional option, apparatus 10 may include convenience features which convey information about the apparatus 10 to a user. For example, apparatus 10 may be provided with lights or instruments which tell the user information such as the status of the lamina supply, the status of the clutch-controlled elements, heater temperature, orientation of the card straightener axis, number of laminate sheets cut by the scissors 42, and the like.

Figure 9:
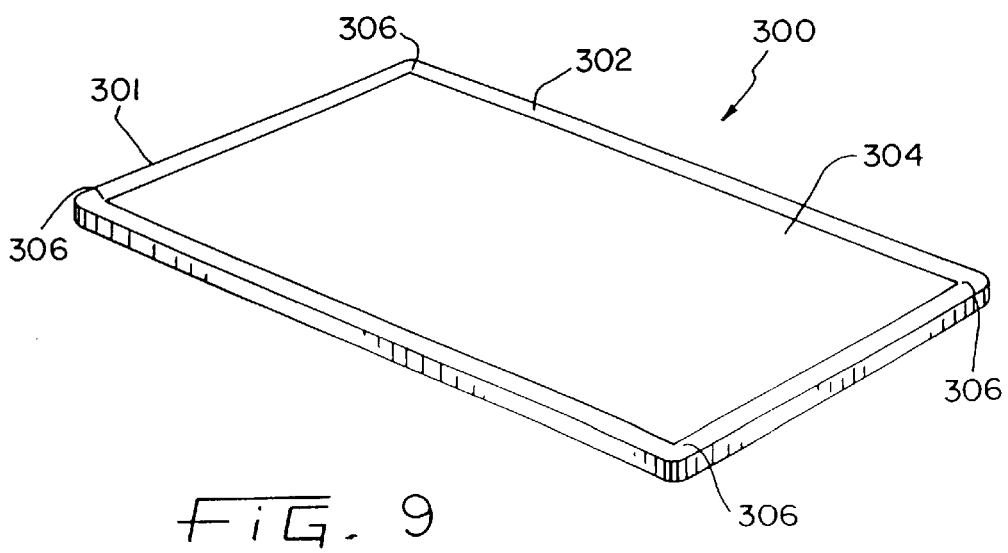
FIG. 9 is a perspective view of a laminated substrate prepared in accordance with the present invention.

FIG. 9 shows a laminated substrate 300 prepared in accordance with the present invention. Laminated substrate 300 includes card-shaped substrate 301 having face 302. Substrate 301 may be made from a variety of materials such as, for example, paper, cardboard, plastic, metal, or the like. Face 302 may include information such as photographs, other graphics, text, data, or the like. Laminate sheet 304 is bonded to face 302. Optionally, the bottom face (not shown) of substrate 301 may also include information and have a second laminate sheet bonded to it as well. Corners 306 are angular, not rounded, and are most typically substantially square. Square corners result when scissors 42 of FIG. 1 is used to cut lamina 18 along a cutting line which is substantially perpendicular to the sides of lamina 18. Advantageously, laminate sheet 304 is slightly narrower and slightly shorter than the face 302 in order to ease registration of the laminate sheet 304 onto face 302. For example, use of a laminate sheet 304 which is 1/8" (0.32 cm) shorter and 1/8" (0.32 cm) narrower than substrate 301 has been found to be suitable in the practice of the present invention.

The characteristics of laminated substrate 300 are distinguishable over laminated substrates made using the prior art techniques described above. For example, when using the "decal" approach, the entire face 302 is covered by laminate material. When using the "die-cut" approach, the laminate sheet corners have been rounded, not square.

Figure 16:
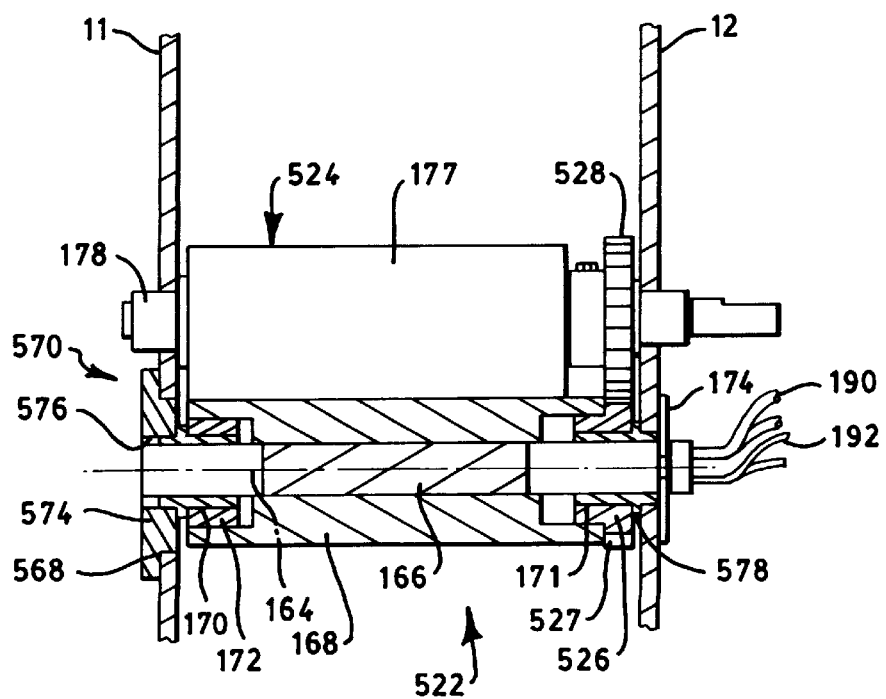
FIG. 16 is a side view of the heating apparatus used in the assembly of FIG. 11 with some parts shown in cross-section.
Figure 11:
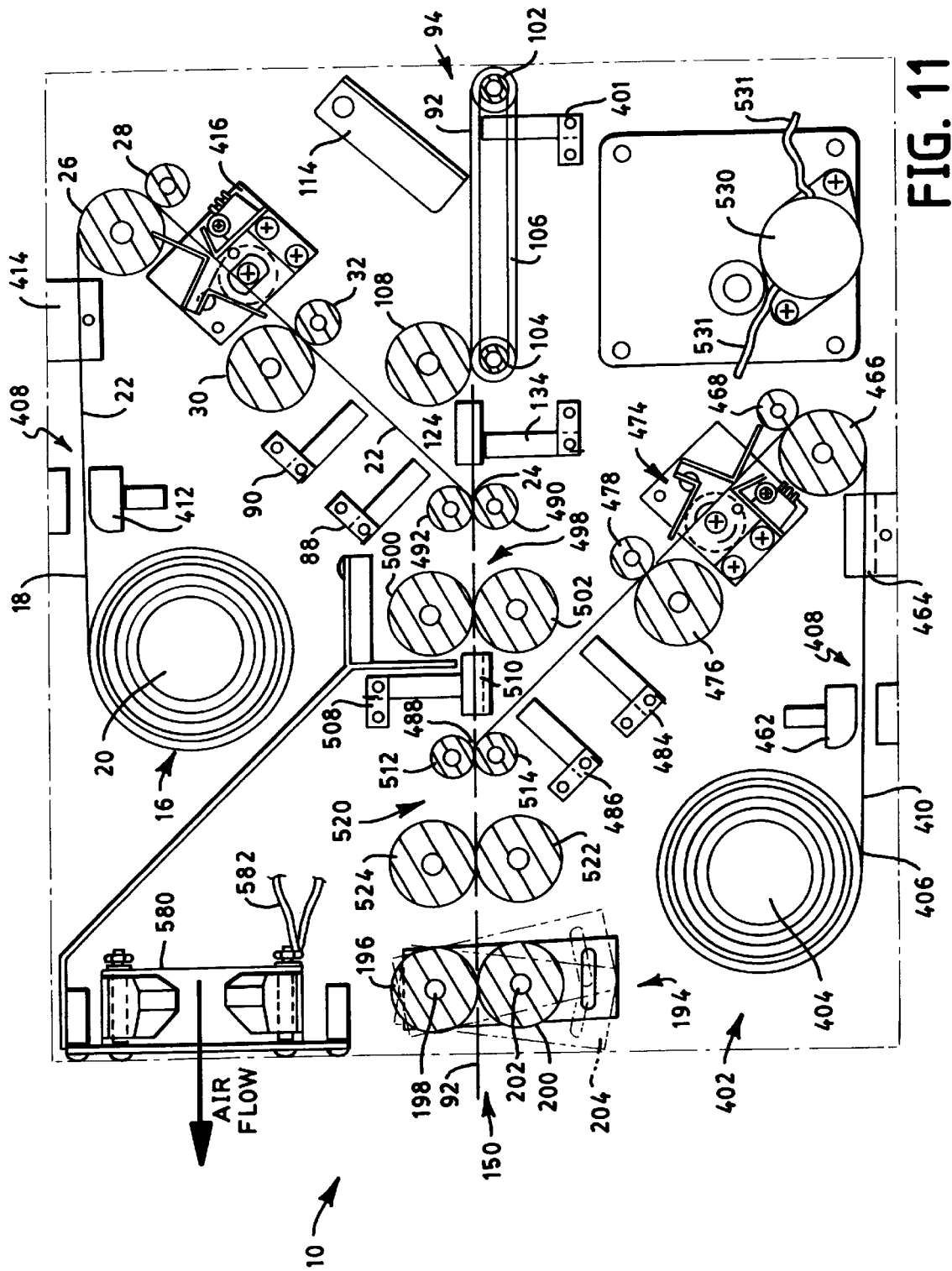
FIG. 11 is a plan view showing a second embodiment of a lamina processing assembly in accordance with the present invention.
Figure 12:
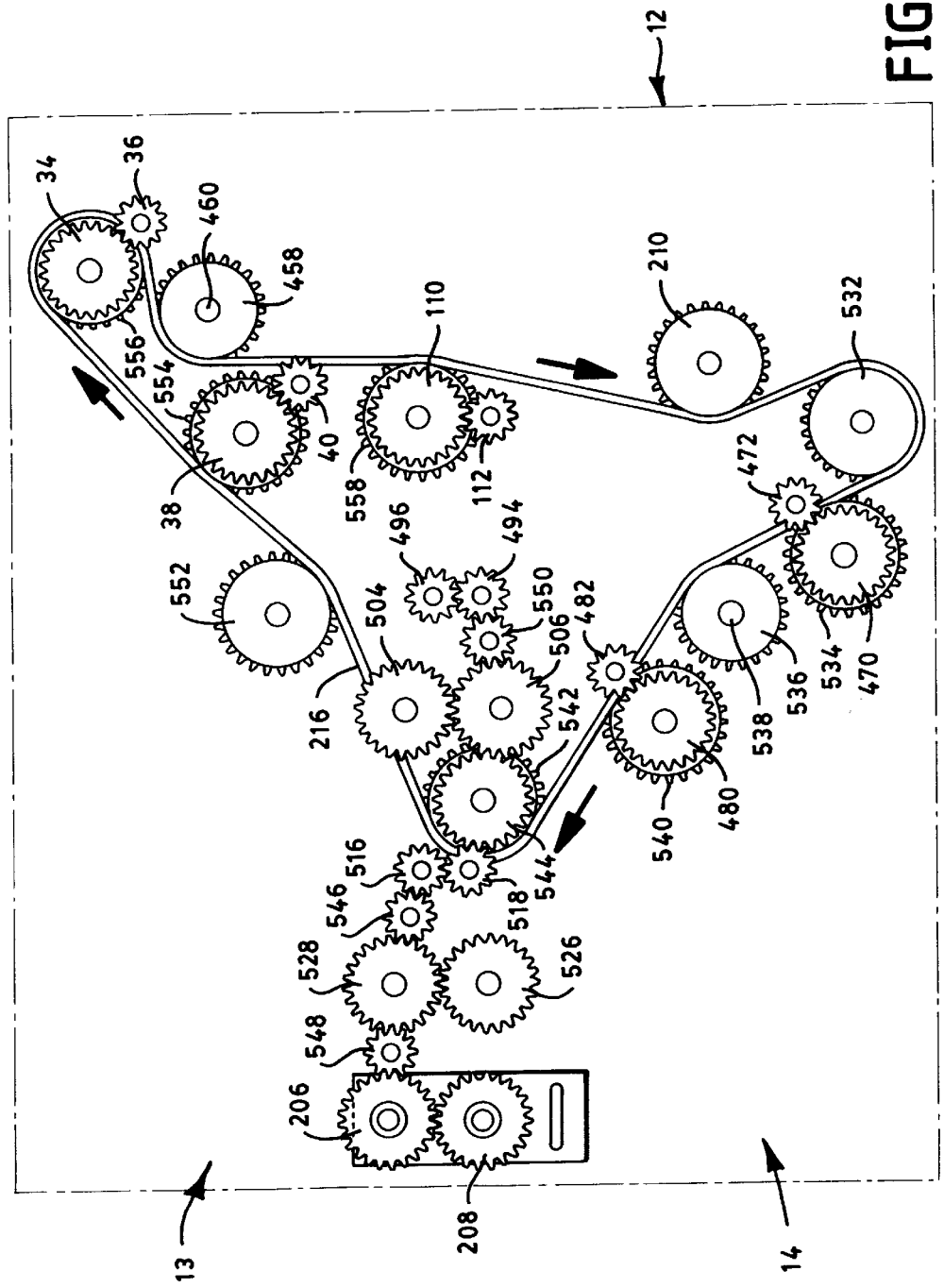
FIG. 12 is a gear drive train of the present invention corresponding to the lamina processing assembly of FIG. 11.

A second embodiment of apparatus 10 is shown in FIGS. 11 and 12. The apparatus 10 comprises a support structure containing a front housing wall 11 (part of which is shown in FIGS. 6 and 16) and a rear housing wall which for purposes of clarity is not shown in the drawings. Middle housing wall 12 shown in FIG. 12 is disposed between the front housing wall and the rear housing wall and divides apparatus 10 into two main chambers. First chamber 13 houses gear and sprocket drive train, generally designated 14 in FIG. 12. The second chamber 15 houses the lamina processing assemblies, generally designated 16 and 402 in FIG. 11.

The lamina processing assembly 16 includes a lamina supply member 20 on which a supply roll of heat bondable lamina 18 is rotatably stored. A wide variety of heat bondable lamina materials may be used in the practice of the present invention, such as "TBSN" lamina material available from Transil Wrap, 2615 North Paulina St., Chicago, Ill. 60614 and "H12-V" lamina material available from the Minnesota Mining and Manufacturing Company (3M) of Minneapolis, Minn.

Similarly, the lamina processing assembly 402 includes lamina supply member 404 on which a supply roll of heat bondable lamina 406 is rotatably stored.

A lamina supply route 408 is comprised in the embodiment shown in FIG. 11 of upper lamina supply path 22 and lower lamina supply path 410. Upper lamina supply path 22 extends from lamina supply member 20 through lamina sensor 412. Lamina sensor 412 produces a detectable response when lamina 18 is used up. Following lamina sensor 408 along supply path 22 is upper lamina guide 414. Upper lamina guide 414 is comprised of double vertical and horizontal walls (not shown) which maintain lamina supply 18 on lamina path 22. Conveyors of lamina are positioned along lamina supply path 22. For example, lamina supply path 22 passes between a first set of corresponding conveyor rollers, or "pinch rollers" 26 and 28 and a second set of corresponding conveyor rollers 30 and 32. The rollers disposed along the lamina supply path 22, operating together, serve as a lamina conveyor for lamina 18. The lamina conveyor conveys lamina and laminate sheets by using corresponding pairs of rollers. Roller pair 26, 28 for example, comprises top roller 26 disposed above the lamina supply route, wherein a circumferential limit of roller 26 substantially coincides with the plane tangent to the supply route. Roller 28 is disposed below the lamina supply route, wherein a circumferential limit of roller 28 substantially coincides with the same plane. Thus, the top and bottom rollers are rotatably driven and capable of engaging and conveying either the lamina supply or a laminate sheet. Disposed between roller pairs 26, 28 and 30, 32 is a cutter generally designated as 416. First set of rollers 26 and 28 are disposed along lamina supply path 22 in a position which is upstream relative to cutter 416 whereas the second set of rollers 30 and 32 are located along lamina supply path 22 at a position downstream relative to cutter 416.

Referring to FIG. 12, first set of rollers 26 and 28 are rotatably driven by gear and sprocket assembly 34 and idler gear 36, respectively. In a similar fashion, second set of rollers 30 and 32 are rotatably driven by gear and sprocket assembly 38 and idler gear 40, respectively. The rotation of the gear and sprocket assemblies, which is activated by magnetic clutches (not shown), cause the conveyor rollers 26, 30, 28 and 32 to correspondingly rotate. Rotation of these rollers, in turn serves as a lamina conveyor and causes transport of lamina 18 along lamina supply path 22. As explained in more detail below, roller pair 26, 28 rotates slightly slower than does roller pair 30, 32 so that lamina 18 is tensioned and any "slack," or wrinkles in the lamina 18 is removed. Desirably, lamina guides (not shown in FIG. 11 for purpose of clarity) may be disposed along the top and bottom of the lamina supply path 22 to help guide lamina 18.

In the embodiment shown in FIGS. 11 and 12, cutter 416 is a rotary cutter. Referring to FIGS. 11, 3a and 3b, rotary cutter 416 is disposed on the lamina supply path 22 for cutting the supply of lamina 18 along cutting line 44 at a predetermined distance d, from leading edge 46 of lamina 18. Cutting of lamina 18 along cutting line 44 provides heat bondable laminate sheet 48 having the same leading edge 46, but a newly provided trailing edge 50 at the cutting line 44. Cutting of lamina 18 along cutting line 44 also provides the supply roll of lamina 18 with a successive leading edge 52. The remaining portion of lamina 18 may then be cut along successive cutting line 55 to provide the next sheet of lamina corresponding to the portion of lamina 18 between successive leading edge 52 and successive cutting line 55. Additional sheets of laminate can be successively cut from the remaining portion of lamina 18 in a similar fashion until the supply of lamina runs out.

Advantageously, in the practice of the present invention, a plurality of laminate sheets can be cut from lamina supply 18 with substantially no waste between the trailing edge of each cut sheet and the successive leading edge of the next laminate sheet. As a result, except for the couple of inches or less of material remaining at the end of a roll, the present invention generates no wasted lamina, in stark contrast to prior art approaches which waste significant amounts of material.

Figure 13:
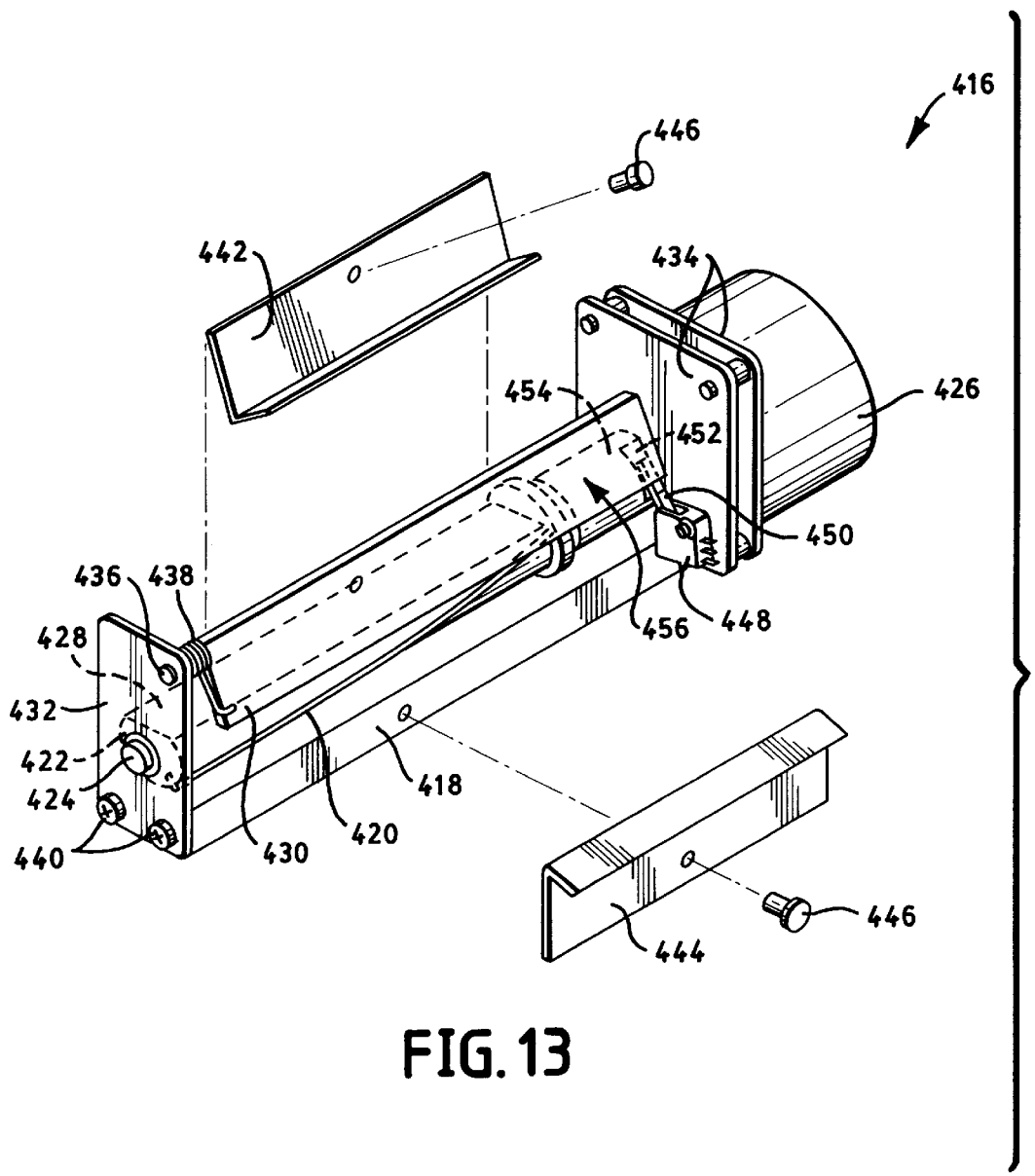
FIG. 13 is a partially exploded perspective view of a motor driven rotary cutter in accordance with the present invention.
Figure 14:
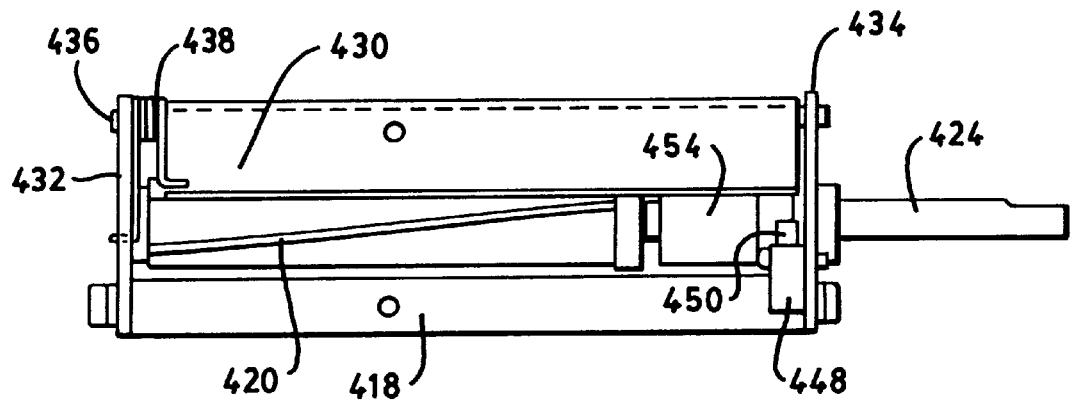
FIG. 14 is a front elevational view of the cutter of FIG. 13.
Figure 15:
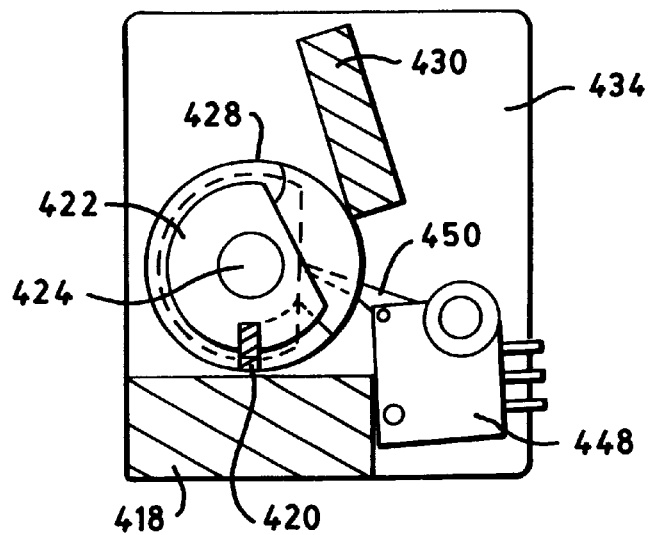
FIG. 15 is a side elevational view in partial cross section of the cutter of FIG. 13

Referring in particular now to FIGS. 11, 12, 13, 14 and 15, and FIG. 13 in particular, rotary cutter 416 is secured in apparatus 10 upon bottom support bar 418. Screws 440 hold cutter 416 against bottom support bar 418. Rotary cutter 416 includes a rotating blade 420 provided on blade shaft 422. In turn, blade shaft 422 is disposed circumferentially around drive axle 424. Axle 424 extends along the entire length of cutter 416 and is connected to magnetic clutch 426. Instead of using a clutch, a servo motor could be used. For convenience, clutch 426 is illustrated in FIG. 13 whereas only axle 424 is shown in FIG. 14. As shown in FIGS. 13 and 15, blade shaft 422 has a flattened portion 428 disposed thereon. Flat portion 428 allows passage of lamina 18 along lamina supply path 22 when rotary cutter 416 is not operating. Thus, one end of rotating blade 420 coincides with flattened portion 428 and blade 420 extends along the cylindrical surface of blade shaft 422 to the opposite end of blade shaft 422.

As shown in FIGS. 13 and 14, one end of fixed blade 430 is attached to fixed plate 432 and the other end is attached to fixed plate 434. Attachment pins 436 are used to secure the fixed blade 430 to fixed plates 432 and 434. Biasing spring 438 biases blade 430 downwardly, as shown in FIGS. 13 and 14. Upper guide 442 and lower guide 444 (omitted in FIGS. 14 and 15) are secured to rotary cutter 416 by screws 446 as shown in exploded form in FIG. 13. Upper and lower guides 442 and 444, respectively, guide lamina 18 through cutter 416.

Referring now to FIGS. 13 and 14, and in particular FIG. 15, cutter 416 is provided with switch 448 which activates cutter 416. Instead of a switch, a microprocessor could be used to activate or deactivate the cutter. Switch 448 includes pivotable switch arm 450 which is pivotably biased against flat portion 452 of switch shaft 454. At rest, rotating blade 420 is positioned as shown in FIGS. 13 and 14. In operation, rotating blade 420 rotates in the direction shown by arrow 456 in FIG. 13. During a revolution, switch arm 450 slidably engages switch shaft 454. Upon encountering flat portion 452, switch arm 450 pivots and activates switch 448, which in turn disengages clutch 426. In this manner, switch 448 serves to disengage the rotating blade after one complete revolution.

While various types of cutters could be employed, it has been found that cutter 416, which is a modified version of a model YZ3-948695-25N cutter available from Hitachi Metals Corporation Ltd. of Japan, performs well. The modified cutter, model YZ3-92340001 is also manufactured by Hitachi Metals Corporation Ltd.

The activation of cutter 416 can be further illustrated with reference to FIGS. 12 and 13. With reference to FIG. 12, timing belt 216 passes along an outer circumference of cutter gear 458 causing cutter gear 458 to rotate. Axle 460 is disposed in cutter gear 458 and connects to clutch 426 as shown in FIG. 13. In turn, clutch 426, upon being signaled, can rotatably engage axle 424 causing blade 420 to rotate one revolution. Thereupon, switch 448 disengages clutch 426 so that blade 420 stops rotating. The cutting process repeats when clutch 426 is again provided a cutting signal.

Returning to FIG. 11, apparatus 10 includes sensor 88 provided along supply path 22 between cutter 416 and convergence zone 24 in order to detect when a predetermined reference on lamina 18 is positioned a predetermined distance from the cutting line of cutter 416. Such a reference may be any suitable feature of lamina 18 which can be detected by sensor 88. Examples of such features include the leading edge of lamina 18 as well as markings, such as authentication images, provided on the surface of lamina 18. In the particular embodiment shown in FIG. 11, sensor 88 is disposed at a predetermined distance from the cutting line of cutter 416 to detect each successive leading edge of the supply of lamina 18 as lamina 18 is conveyed along lamina supply path 22. When sensor 88 detects each such leading edge, lamina 18 being conveyed is stopped and cutter 416 is then actuated to cut lamina 18. As this process is repeated, all of the resulting laminated sheets will have been cut to a substantially identical length corresponding to the distance between sensor 88 and the cutting line of cutter 416. Advantageously, this approach is extremely accurate, reliable, and repeatable.

For example, laminate sheets are used to laminate many kinds of ISO Standard CR-80 type cards. All such cards, within specification tolerances, are characterized by a width of 2⅛ inches (5.40 cm) and a length of 3⅜ inches (8.57 cm). By providing a supply of lamina having a width of 2 inches (5.08 cm), and by positioning sensor 88 at a predetermined distance of 3¼ inches (8.25 cm) from the cutting line of scissors 42, a plurality of sheets suitable for laminating such cards can be easily provided using apparatus 10 of the present invention.

In other applications, lamina supply 18 may bear a plurality of authentication images, such as holographic images or the like, which must be precisely positioned on each corresponding substrate. For example, drivers licenses of some states and countries include a holographic authentication image precisely positioned over portions of the photographic image and textual information included on such licenses. To use apparatus 10 to make a plurality of laminated sheets suitable for laminating such substrates, apparatus 10 includes feature sensor 90 as shown in FIG. 11. Generally, available lamina supplies have security features such as UV features or holographic features spaced apart at a predetermined distance. However, the distances are not entirely accurate and can vary slightly along the length of the lamina supply roll. If the distance between security features was entirely accurate, such features could be aligned with a substrate card by using only leading edge sensor 88 and then relating the distance between the leading edge and the security feature. However, because the predetermined distance between security features is not entirely accurate, such an approach would produce cumulative error when laminating a plurality of cards. For example, a ¹⁄₆₄ inch error in distance between predetermined security features would produce a 1 inch error in the position of the security feature relative to the substrate card after 64 sheets have been cut.

The present invention avoids the problem of error in distance between the security features on the commercially available lamina rolls by using leading edge sensor 88 in conjunction with feature sensor 90. When a security feature is aligned with the substrate card, leading edge sensor 88 is positioned short of the desired length of the cut sheet. Thus, when leading edge sensor 88 senses a leading edge of lamina 18, it signals feature sensor 90. Feature sensor 90 then takes over and "fine-tunes" the conveyance of lamina sheet 18, thereby precisely positioning the sheet for proper registration with a substrate card. This way, the security features on the lamina supply can be exactly aligned with the proper position on the substrate card for each successive card. Errors in the preset distance between security features are therefore corrected by allowing the position of the leading edge of the lamina relative to the leading edge of the substrate card to vary slightly. Such variations are insignificant to the quality of the laminated product. Alternatively, in other applications where a security feature does not need to be aligned with any special position on the substrate card, feature sensor 90 can be turned off. In such event, only leading edge sensor 88 would be employed. In any event, the leading edge of the lamina can be positioned for cutting into a laminate sheet by cutter 416. After cutting, the laminate sheet will be ready for transport into convergence zone 24 by conveyor rollers 30 and 32.

In the practice of the present invention, sensors 88 and 90 used in apparatus 10 may be any type of sensor known in the art which would be suitable for detecting the predefined reference of the lamina. One example of a type of sensor found to be suitable for this purpose in the practice of the present invention for this purpose is a standard reflective type LED sensor. Such sensors are reliable and accurate. Further, as known in the art, the reliability and accuracy of such sensors can be even further improved by placing a dull, black, nonreflective plate (not shown), or another nonreflective type of member, in opposition to such sensors in order reduce the tendency of such sensors to generate false detection signals.

Lamina supply route 408 also includes lower lamina supply path 410 which provides lamina for laminating the bottom surface of a substrate card. Lower sensor 462 can be identical to upper sensor 412 and provides a signal when lamina supply 406 is depleted. Next, lower lamina guide 464 is disposed along lamina supply path 410. Lower lamina guide 464 is identical to upper lamina guide 414 and maintains alignment of lamina 406 on lower lamina supply path 410. Lamina supply path 410 continues between conveyors 466 and 468 which are driven by conveyor gears 470 and 472, respectively, as shown in FIGS. 11 and 12.

Lamina supply path 410 continues through rotary cutter 474, which is identical to rotary cutter 416. On the downstream side of rotary cutter 474 disposed along lamina path 410 are conveyors 476 and 478 which are driven by gears 480 and 482, respectively, as shown in FIGS. 11 and 12. Conveyor rollers 476 and 478 perform the same function as rollers 30 and 32, respectively, in upper lamina supply path 22. As was the case with upper lamina supply path 22, roller pair 466, 468 disposed along lower lamina supply path 410 rotates slightly slower than does roller pair 476, 478. Similarly, feature sensor 484 and leading edge sensor 486 perform functions identical to feature sensor 90 and leading edge sensor 88, respectively, for upper lamina supply path 22. Thus, as can be seen in FIG. 11, the lower lamina supply path 410 and upper lamina supply path 22, which comprise supply route 408, are substantially identical. The difference between the upper lamina supply path 22 and lower lamina supply path 410 is in their respective orientations and the fact that they provide lamina for a top and bottom side of the substrate card, respectively. Lower lamina supply path 410 connects to substrate supply path 92 in convergence zone 488.

Having described lamina supply route 408 which includes upper lamina supply path 22 and lower lamina supply path 410, attention is now turned to substrate supply path 92. Referring now to FIGS. 11, 12 and 6, apparatus 10 includes a substrate supply path 92 extending from substrate entry zone 94 to exit 150. A substrate guiding device, generally designated 96 as shown in FIG. 6, is provided on substrate supply path 92 near substrate entry zone 94. Substrate guiding device 96 includes bevelled entry blocks 98 and 99 provided on each side of the substrate supply path 92. As seen best in FIG. 6, bevelled entry block 98 is mounted on front housing wall 11, and bevelled entry block 99 is mounted on middle housing wall 12. Above bevelled entry blocks 98 and 99, deflection plate 114 is pivotably disposed between auxiliary plates 116 and 117 on axle 118. Deflection plate 114 biases the substrates downward onto substrate supply path 92. A plurality of structural members, such as structural members 120, 121, 122 and 123, are provided in order to impart strength and rigidity to apparatus 10.

First conveyor roller 102 is rotatably supported between bevelled entry blocks 98 and 99. Further along the substrate supply path 92, path 92 passes between pinch roller 108 and second conveyor roller 104. A pair of endless loop drivers 106 and 107, which acts as a conveyor belt, are mounted around first conveyor roller 102 and second conveyor roller 104. Pinch roller 108 and second conveyor roller 104 are rotatably driven by clutch-controlled gear and sprocket assembly 110 and idler gear 112, respectively as shown in FIG. 12. Rotation of second conveyor roller 104, in turn, causes rotation of endless loop drivers 106 and 107 about first conveyor roller 102 and second conveyor roller 104. Such rotation of endless loop drivers 106 and 107 causes transport of a substrate along that portion of substrate supply path 92 corresponding to endless loop drivers 106 and 107. Several pairs of roller, such as roller pair 490, 492 and roller pair 512, 514, are disposed along substrate path 92 and serve as a substrate conveyor. These roller pairs are typically comprised of a first roller, such as roller 492 disposed above substrate supply path 92, wherein a circumferential limit of roller 492 substantially coincides with the plane tangent to supply path 92. Bottom roller 490 is disposed below the substrate supply path 92 as shown in FIG. 12, wherein a circumferential limit of roller 490 also substantially coincides with the plane tangent to substrate path 92. Operating together, rollers 492 and 490, and other roller pairs disposed along substrate path 92, are capable of conveying the substrate and laminate sheets along supply path 92.

"Wake-up" sensor 401 is positioned along substrate supply path 92 at entry 94. Sensor 401 detects when a reference on the substrate is positioned in line with sensor 401. As is the case with lamina 18 and lamina 406, the substrate feature can be any suitable feature of the substrate which can be detected by sensor 401, such as the leading edge of the substrate. When wake-up sensor 401 detects the reference, motor 530 is turned on, whereupon gears 110 and 112 shown in FIG. 12 begin turning and consequently conveyor rollers 108 and 104 turn as well. When the apparatus 10 has been waiting a pre-set period of time without laminating a substrate, the motor is automatically turned off, thereby saving energy and reducing motor noise.

Support member 124 is provided for supporting the substrate along another portion of path 92 after the substrate is conveyed past pinch roller 108 and second conveyor roller 104. Support member 124 is shown schematically in FIG. 11 and does not show structural details. However, support member 124 is depicted in more detail in FIG. 1, and reference to support member 124 as shown in FIG. 1 is made to more clearly illustrate support member 124 shown in FIG. 11. Support member 124 has a flat upper surface 126 providing a pathway which is slidably engaged by the substrate as the substrate is conveyed across support member 124. Support member 124 further includes a pair of sidewall members, one of which is shown as sidewall 128, to help constrain the substrate in position on upper surface 126. Upper surface 126 may include an entry bevel 130, and the sidewall members may include entry bevels such as bevel 132, in order to ease entry of the substrate onto support member 124.

With further reference to FIG. 11, sensor 134 is provided on substrate supply path 92 and is identical to sensor 134 as shown in FIG. 1 in more detail. Thus, the description of sensor 134 shown in FIG. 11 is made with reference to identical sensor 134 shown in FIG. 1, wherein sensor 134 is mounted in position by fastening sensor flange 136 to the lower surface 137 of support member 124 with a suitable fastener, such as screw 138. Sensor 134 detects when a reference on the substrate is at a predetermined distance from convergence zone 24. As was the case with lamina 18 and lamina 406, the substrate reference may be any suitable feature of the substrate which can be detected by sensor 134. Examples of such features include the leading edge of the substrate as well as any markings, such as images or textual information, which may be provided on the substrate.

In the particular embodiment shown in the FIG. 11, the position of sensor 134 is coordinated with the position of sensor 88 so that the substrate and the top laminate sheet, after the sheet has been cut from lamina 18, arrive at convergence zone 24 in a manner which allows the substrate and the laminate sheet to be brought together in proper registration. For example, the cut sheet of laminate and the substrate desirably arrive at the convergence zone 24 at substantially the same time while being conveyed at substantially the same speed along their respective paths. In such embodiments, the distance between convergence zone 24 and sensor 134 is substantially the same as the distance between convergence zone 24 and sensor 88. The laminate sheet is slightly smaller than the substrate.

In the practice of the present invention, sensor 134 may be any sensor known in the art which would be suitable for detecting the predefined reference of the substrate. As was the case with sensors 88 and 90, one example of a type of sensor found to be suitable in the practice of the present invention is a standard reflective type LED sensor. As was also the case with sensors 88 and 90, the performance of such a sensor can be improved by placing a dull, nonreflective, black plate (not shown), or another nonreflective type of member, in opposition to said sensor in order to reduce the tendency of such sensor to generate false detection signals. Due to the positioning of sensors 88 and 134, a single plate may be disposed between the two sensors in order to reduce such false detection incidents.

In convergence zone 24, the top laminate sheet and substrate are registrably brought into contact to provide a sheet-bearing substrate. Convergence zone 24, as shown, comprises a pair of conveyor rollers 490 and 492 which are rotatably driven by gears 494 and 496, respectively, as shown in FIG. 12. Lamina supply path 22 and substrate supply path 92 converge between conveyor rollers 490 and 492. Thereafter, the substrate and top laminate sheet continue along substrate path 92.

Continuing now along substrate path 92, bonding station 498 is disposed along path 92 and is comprised of heated roller 500 on a top side of substrate path 92 and pressure roller 502 disposed on the bottom side of substrate path 92. As the laminate bearing substrate is conveyed along path 92, pressure is applied from rollers 500 and 502. Heat, which activates the adhesive in the laminate, is supplied from roller 500, thereby bonding the laminate sheet to the top surface of the substrate as it passes through bonding station 498.

Although not shown in FIG. 11, bonding station 498 is provided with an adjustment plate such as adjustment plate 162 shown in FIG. 1 so that bonding station 498 can be adjusted to accommodate different thicknesses of substrates and laminates. Heated roller 500 and pressure roller 502 are driven by gears 504 and 506, respectively, as shown in FIG. 12.

Continuing along substrate path 92 beyond bonding station 498, a sensor 508 is disposed. Sensor 508 is substantially identical to sensor 134, except that sensor 508 is positioned on an opposite side of substrate path 92 than is sensor 134. Immediately along substrate path 92 and beyond bonding station 498 is support member 510. Support member 510 is identical to support member 124 and maintains alignment of the newly top surface laminated card as it passes therethrough. Sensor 508 is in communication with conveyor rollers 476 and 478 on lower lamina supply path 410 so that when sensor 508 detects a substrate card exiting bonding station 498, sensor 508 signals conveyor rollers 476 and 478 to begin conveying the lower laminate sheet. Thus, the substrate card, having its top side laminated, is brought into registrable alignment with a lower sheet of laminate into convergence zone 488. Convergence zone 488 is similar to convergence zone 24 and is comprised of conveying rollers 512 and 514 which are driven by gears 516 and 518 respectively, as shown in FIG. 12. In convergence zone 488, the bottom sheet of laminate supplied from supply path 410 is brought into registrable contact with the bottom surface of the substrate, whereupon conveying rollers 512 and 514 transport the substrate and bottom lamina sheet to bonding station 520. Bonding station 520 is comprised of lower heated roller 522 and upper pressure roller 524 which are driven by gear 526 and 528 respectively as shown in FIG. 12. Bonding station 520 is similar to bonding station 498 except that in bonding station 520 the position of the heated roller is on the bottom so that the bottom laminate sheet may be bonded to the bottom of the substrate. As the bottom laminate sheet and correspondingly aligned substrate pass through bonding station 520, heat is transferred from heated roller 522 to the bottom laminate sheet and such heat activates the adhesive on the bottom lamina sheet so that the lamina sheet bonds to the bottom surface of the substrate. The temperature of roller 522 is independently adjustable as compared to roller 500. In the embodiment shown in FIG. 11, heated roller 522 is operated at a lower temperature than heated roller 500. This is because heat is first applied to the substrate by heated roller 500 and the substrate retains some of that heat as it is conveyed along substrate path 92 to bonding station 520. Since the substrate is already heated somewhat when it reaches bonding station 520, it is not necessary to heat roller 522 to as a high a temperature as is heated roller 500. Indeed, maintaining roller 522 at the same temperature as roller 500 would result in excess deformation of the substrate card and, perhaps, melting of the substrate card. Such melting would undesirably leave a residue on rollers 520 and 522.

Bonding station 520 is shown in partial cross section in a side elevational view in FIG. 16. As shown best in FIGS. 8 and 16, heated roller 522 includes a non-rotatable heater core 164 having a heated portion 166. Rotatable outer shell 168 is disposed on non-rotatable heater core 164 such that the non-rotatable heater core 164 heats rotatable outer shell 168. Rotatable outer shell 168, in turn, heatably bonds the bottom laminate sheet to the bottom of the substrate. Rotatable outer shell 168 is coupled to non-rotatable heater core 164 by any suitable bearing means which allows rotatable outer shell 168 to rotate freely about the non-rotatable heater core 164. As shown in the embodiment in FIG. 16, rotatable outer shell 168 is coupled to non-rotatable heater core 164 by inner pair of bearings 170 and 171 and outer pair of bearings including sleeve bearing 172 and the hub of gear 526 which serves as the other outer bearing. Gear 526 couples the heated roller assembly 522 to roller 524.

In one mode of practicing the present invention, inner bearings 170 and 171 are non-rotatably coupled to the non-rotatable heater core 164. Additionally, outer bearing 172 and the hub of gear 526 are non-rotatably coupled to rotatable outer shell 168. Outer bearing 172 and the hub of gear 526, however, are fully rotatable about inner bearings 170 and 171, respectively. In order to reduce friction between the two sets of bearings, it is desirable that at least one set of such bearings comprises a self lubricating resin which is preferably polytetrafluorethylene. Polytetrafluorethylene is more commonly referred to by its trade designation "Teflon". For example, inner bearings 170 and 171 may be fabricated from Teflon brand resin and outer bearing 172 and gear 526 may be fabricated from stainless steel.

Figure 17:
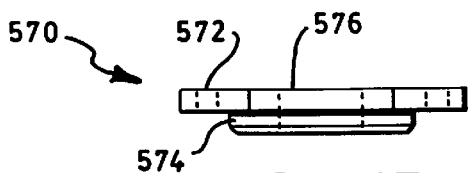
FIG. 17 is a side elevational view partially in phantom of an access plate of the present invention.
Figure 19:
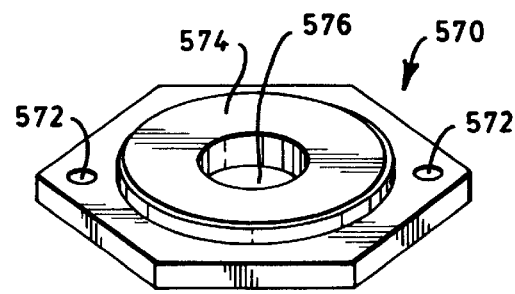
FIG. 19 is a perspective view of the access plate of FIG. 17.
Figure 18:
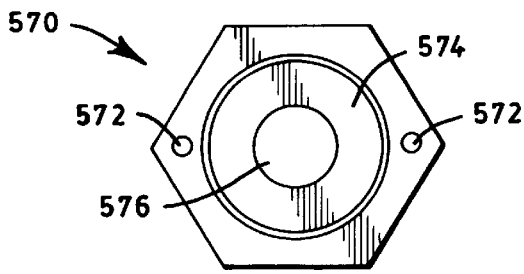
FIG. 18 is a top view of the access plate of FIG. 17.

For ease in servicing, front wall 11 is provided with circular access hole 568. Hole 568 is sufficiently large so that the fingers of a service person can reach through wall 11 to service and remove roller assembly 522 whereas heater core 164 remains within apparatus 10. The diameter of hole 568 is larger than the outside diameter of roller 522 so that roller 522 can be conveniently passed through hole 568. Access plate 570 fits into hole 568 as shown in FIG. 16. Access plate 570 is shown in FIGS. 17–19 as a hexagonally shaped plate with apertures 572 and donut-shaped protrusion 574. The outside diameter of protrusion 574 is machined only slightly smaller than the diameter of hole 568 so that protrusion 574 fits within hole 568 without adversely affecting alignment of roller 522. Plate 570 also includes cylindrical bore 576 which receives innner bearing 170 as shown in FIG. 16. In the practice of the present invention, inner bearing 170 is press fitted into bore 576 and is thereby secured within bore 576. Screws or other suitable fasteners can be installed into apertures 572 to secure plate 570 and therefore roller 522 into apparatus 10.

Returning to FIG. 16, heated roller assembly 522 is mounted between middle housing wall 12 and front housing wall 11. Middle housing wall 12 desirably includes an aperture for receiving a corresponding end of non-rotatable heater core 164. Flange 174 is used to secure the heated roller assembly to middle housing wall 12 using any suitable fasteners, such as screws (not shown).

Removal and replacement of heated roller assembly 522 is readily facilitated in the practice of the present invention. First, screws which are used to secure plate 570 to wall 11 are removed. Next, a person's fingers can be used to pull plate 570 outwardly from wall 11. In so doing, plate 570 and bearing 170, which is secured in bore 576, are removed together. The access plate 570 can then be set aside and the person's fingers can again be used to pull roller assembly 522 from apparatus 10 through hole 568. Removable roller assembly 522 includes outer shell 168, bearing 172 and gear 526. Heater core 164 and bearing 171 remain within apparatus 10 when roller assembly 522 is removed. Installing a new, reserviced, or cleaned roller assembly in apparatus 10 is accomplished by first inserting roller assembly 522 into hole 568 and aligning teeth 527 of gear 526 with the teeth of gear 528. Slight rotation of roller assembly 522 back and forth is normally required in order to properly align the corresponding teeth of gears 526 and 528 so that the gears mesh. Once the gears are meshed, roller 522 can be fully inserted into apparatus 10 until the hub of gear 526 abuts flange 578 of bearing 171. Finally, access 570 can be replaced into hole 568 and the screws can be inserted into apertures 572 and tightened.

As shown in FIG. 16, upper roller 524 of bonding station 520 includes a roller body 177 and an axle 178. Axle 178 is rotatably received in corresponding apertures provided in middle housing wall 12 and front housing wall 11. Roller 524 is rotatably driven by gear 528. Gear 528 meshes with gear 526 and rotatably drives gear 526, which in turn rotatably drives heated roller 522.

Energy for heating heated portion 166 of non-rotatable heater core 164 is provided to heated roller 522 through heater wires 190 as shown in FIGS. 16 and 8. Thermocouple wires 192 are used to monitor the temperature of non-rotatable heater core 164. In order to maintain the non-rotatable heater core 164 at a desired temperature, the energy supply to heater wires 190 can be increased or decreased, as needed.

The process of using heat to bond the laminate sheet to the substrate can cause the resultant laminated substrate to bend, or "cargo" as such bending is sometimes called. Depending upon the materials used to fabricate the laminate sheet and the substrate, the face of the laminated substrate bearing the laminate sheet can be characterized by a convex or concave bend. It is desirable, therefore, to apply a reverse bend to the laminated substrate in order to remove such convex or concave bend.

Accordingly, as seen best in FIGS. 11 and 12, card straightener 194 is provided on substrate path 92 for applying a reverse bend to the laminated substrate after the laminated substrate leaves bonding station 520. In the embodiments of the present invention as shown in the Figures, card straightener 194 is an assembly comprising a first pinch roller 196 having a center of rotation 198 and a second pinch roller 200 having a center of rotation 202. Pinch rollers 196 and 200 are rotatably mounted on adjustment plate 204 and are disposed on substrate path 92 such that path 92 passes between rollers 196 and 200. A line extending from the center of rotation 198 to the center of rotation 202 defines a main axis of the card straightener 194. Adjustment plate 204 is pivotable about a pivot point so that the main axis of the card straightener 194 can be pivoted as well. The center of rotation can be positioned at either 202 or 198, and the center of rotation is positioned at 198 in the embodiment shown in FIGS. 11 and 12. Thus, center of rotation 198 serves as the pivot point for adjustment plate 204. Pinch rollers 196 and 200 are rotatably driven by gears 206 and 208, respectively.

Advantageously, because the main axis of card straightener 194 is pivotable, card straightener 194 can be adjusted to provide a reverse convex or concave bend as desired. For example, in the embodiment shown in FIG. 11, center of rotation 198 serves as the pivot point for adjustment plate 204. Pivoting of adjustment plate 204 toward the exit zone 150, as shown in phantom in FIG. 11, causes the main axis of the card straightener 194 to pivot toward exit zone 150 as well. Such an orientation of the axis applies a reverse bend to the laminated substrate in which the leading edge of the laminated substrate is flexed upward. This is a useful approach for applying a reverse bend when the laminated substrate emerges from bonding station 520 in a condition in which the bottom laminate sheet bearing side of the laminated substrate has a concave bend. On the other hand, pivoting of the adjustment plate 204 toward the bonding station 520 causes the main axis to pivot toward bonding station 520 as well. Such orientation of the main axis applies a reverse bend to the laminated substrate in which the leading edge of the laminated substrate is flexed downward by card straightener 194. This is a useful approach when the laminated substrate emerges from the bonding station 520 in a condition in which the laminate bearing side of the bottom laminated substrate has a convex bend.

Gear and sprocket drive train 14 will now be more fully described with particular reference to FIG. 12. Power is supplied to motor 530 through wires 531 as shown in FIG. 11. In turn, motor 530 drives motor gear 210 shown in FIG. 12 with rotational power. Referring now to FIG. 12, drive motor gear 210 rotates in a counter clockwise direction so that timing belt 216 moves continuously in a clockwise direction as shown by arrows in FIG. 12. Instead of a timing belt 216, other devices could be used such as metal chains, roller chains, v-belts, and gears. The operation of gear and sprocket drive train 14 is described starting at drive motor gear 210 and traversing along the direction of movement of timing belt 216.

Drive motor gear 210 rotates counter clockwise and causes timing belt 216 to move in a direction of the arrows so that idler gear 532 rotates in a clockwise direction. Timing belt 216 drives belt gear 534 which is connected to lower lamina conveyor roller gear 470. Belt gear 534 has a magnetic clutch (not shown) attached thereto and when energized, the clutch engages and belt gear 534 then drives roller 470. Throughout this patent specification, servo motors could be substituted for magnetic clutches. Gear 470, in turn, drives gear 472. Belt gear 536 is driven by timing belt 216 and also has a magnetic clutch (not shown) attached thereto, which clutch when engaged activates axle 538. Axle 538, in turn, is connected to rotary cutter 474 disposed on lower lamina supply path 410. Timing belt 216 also drives belt gear 540 which in turn drives roller gears 480 and 482 when engaged. Conveniently, belt gear 534 has a slightly larger diameter than does belt gear 540. Thus, timing belt 216 rotates gear 534 slightly slower than belt gear 540 and in turn, gears 470 and 472 turn slightly slower than do gears 480 and 482. This slight difference in gear speeds causes rollers 466 and 468 to convey the lamina slightly slower than do rollers 476 and 478. As discussed above, this desirably results tensioning of the conveyed lamina and in turn results in slack or wrinkles being removed from conveyed lamina.

Timing belt 216 attaches to belt gear 542 which in turn drives idler gear 544. Idler gear 544 drives roller gears 516 and 518. Roller gear 516 in turn drives gears 528 and 526 and gears 206 and 208 through idler gears 546 and 548 respectively. Idler gear 544 also drives gears 504 and 506 from bonding station 498 which in turn drives gears 494 and 496 through idler gear 550.

Timing belt 216 continues from idler gear 544 through belt tensioning gear 552 and onto belt gear 554 which in turn drives roller gear assembly 38 and 40, respectively. Similarly, timing belt 216 passes around belt gear 556 which provides clutch driven power to roller gear assembly 34 and 36, respectively. Conveniently, belt gear 556 has a slightly larger diameter than does belt gear 554. Thus, timing belt 216 rotates gear 556 slightly slower than belt gear 554 and in turn, gears 34 and 36 rotate slightly slower than do gears 38 and 40. This slight difference in gear speeds causes rollers 26 and 28 to convey the lamina slightly slower than rollers 30 and 32. As discussed above, this desirably results in slack or wrinkles being removed from the lamina. Continuing along timing belt 216, belt gear 458 drives axle 460 which operates rotary cutter 416. Finally, timing belt 216 drives belt gear 558 which in turn drives clutch driven roller assembly 110 and 112, respectively.

One mode of operation of the apparatus shown in FIGS. 11 and 12 will now be described. Clutch driven gear and sprocket assemblies 34 and 38 are engaged to cause rotation of rollers 26, 28, 30 and 32. Rotation of these rollers causes the transport of lamina 18 along lamina supply path 22. When the leading edge of lamina 18 is detected by sensor 88 or sensors 88 and 90 as the case may be, clutch driven gear and sprocket assemblies 34 and 38 are disengaged and transport of lamina 18 stops. Rotary cutter 416 is then actuated to cut through lamina 18 along a cutting line to provide a first cut sheet of heat bondable laminate.

Roughly at the same time gears 34 and 38 for upper lamina supply path 22 are engaged, lower lamina supply path 410 clutch driven gear and sprocket assemblies 470 and 480 are engaged to cause rotation of rollers 470, 472, 480 and 482. Rotation of these rollers causes the transport of lamina 18 along lamina supply path 22. When the leading edge of lamina 406 is detected by sensor 486 or sensors 486 and 484 as the case may be, clutch driven gear and sprocket assemblies 470 and 480 are disengaged and transport of lamina 406 stops. Rotary cutter 474 is then actuated to cut through lamina 406 along a cutting line to provide a cut sheet of heat bondable laminate for bonding to the bottom of the substrate.

After rotary cutter 474 cuts lamina 406, apparatus 10 has bottom and top sheets of cut lamina "ready" to be bonded to a substrate. In such a state with top and bottom cut sheets ready for bonding, apparatus 10 is in a "ready" state. In normal operations, apparatus 10 is used in combination with a printer which prints the substrate cards. Immediately after the substrate cards are printed, they are laminated with apparatus 10. However, it has been found that apparatus 10 is able to bond both sides of a substrate cards significantly faster than the substrate cards can be printed. Thus, apparatus 10 must "wait" after preparing the laminate sheets for the card to be printed. Such "wait" time can be several seconds up to a few minutes. Thus, once the top and bottom laminate sheets are cut and ready, motor 530 goes into a "sleep" mode, i.e., it shuts off. Then, as discussed above, when a substrate card is supplied to entry 94, wake-up sensor 401 turns on motor 530, whereby substrate path 92 begins to convey the substrate card.

Conveyance of a substrate along path 92 is thus begun when clutch driven sprocket and gear assembly 110 begins turning as a result of motor 530 being turned on, which in turn actuates rollers 108, 104 and 102. The substrate card enters apparatus 10 through substrate entry zone 94 and may be fed into apparatus 10 in any desired manner. For example, the substrate may be hand fed into apparatus 10 or alternatively, may be automatically fed into apparatus 10 directly from a suitable device, such as a printer. As the substrate enters apparatus 10, deflection plate 114 biases the substrate against endless loop drivers 106 and 107. The substrate could be hand fed to the apparatus or by mechanical means. To convey the substrate along substrate supply path 92, clutch driven gear and sprocket assembly 110 is engaged to rotatable drive roller 108, first conveyor roller 102, second conveyor roller 104, and endless loop drivers 106 and 107.

When the substrate is conveyed far enough along the substrate supply path 92, sensor 134 detects the presence of the substrate. When this happens, clutch driven gear and sprocket assembly 38 is engaged and both the substrate and the lamina sheet are conveyed between pinch rollers 490 and 492 at substantially the same time while being transported at substantially the same speed.

Meanwhile, rollers 500, 502, 512, 514, 522, 524, 196 and 200 are rotatably driven by corresponding components of gear drive train 14, and rotation of these rollers conveys the substrate and laminate along the substrate path 92. As the top laminated sheet and the substrate pass between conveyor rollers 490 and 492, successive portions of the laminate sheet and the substrate are brought into contact. A substrate bearing a top laminate sheet then emerges from between conveyor rollers 490 and 492 and is next conveyed to bonding station 498 where it is conveyed through heated roller 500 and roller 502. As the top laminate sheet and the substrate are pressed together, heat from heated roller 500 activates the adhesive on the top laminate sheet in order to bond the laminate sheet to the substrate.

Upon emerging from bonding station 498, the substrate with a newly laminated top surface is conveyed along path 92 and is detected by sensor 508. When this happens, clutch driven gear and sprocket assembly 480 is engaged and both the substrate and the bottom lamina sheet are conveyed between pinch conveyor rollers 512 and 514 in convergence zone 488 at substantially the same time while being transported at substantially the same speed. As the bottom laminate sheet and the substrate pass between conveyor rollers 512 and 514, successive portions of the bottom laminate sheet and the substrate are brought into contact. A substrate having a top laminated surface and bearing a bottom laminate sheet then emerges from between rollers 512 and 514 and is next conveyed to bonding station 520 where it is conveyed through heated roller 522 and top roller 524. As the bottom laminate sheet and the substrate are pressed together, heat from heated roller 522 activates the adhesive on the bottom laminate sheet in order to bond the laminate sheet to the substrate.

Given the characteristics of particular upper lamina 18, lower lamina 406 and substrate used, the laminated products produced may tend to be characterized either by a convex or concave bend. If this happens, card straightener 194 may be adjusted to apply an appropriate reverse bend to the laminated product before the laminated product leaves apparatus 10 through exit zone 150. Subsequent laminated products are formed from lamina 18, lamina 406 and additional substrates by repeating these operations. Specifically, newly cut sheets from the upper and lower supplies are advanced and cut, and apparatus 10 is powered down, awaiting an additional substrate to be placed into entry 94, whereupon "wake-up" sensor 401 senses the substrate and restarts motor 530.

Any conventional controller or control mechanism can be used in the practice of the present invention to respond to sensor signals, actuate the cutters, and engage and disengage the clutch-controlled elements of the gear and sprocket drive-train 14. As one example, apparatus 10 may include a microprocessor which controls such functions. As an additional option, apparatus 10 may include convenience features which convey information about the apparatus 10 to a user.

Figure 20:
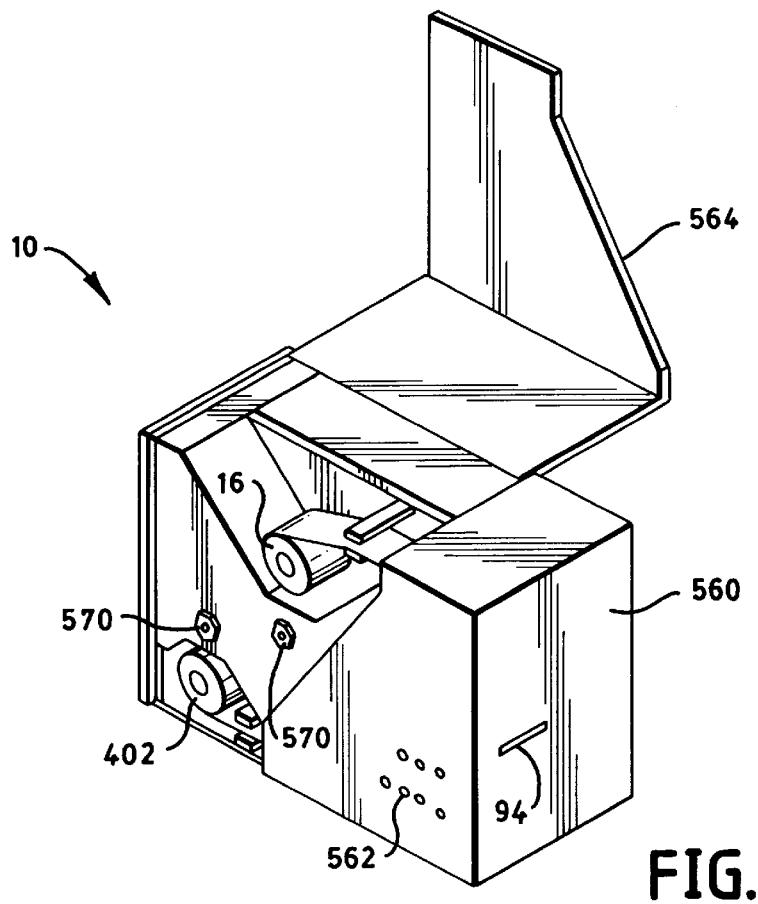
FIG. 20 is a perspective view of an apparatus in accordance with the present invention with a protective case.

Referring now to FIG. 20, apparatus 10 includes case 560 which includes lights 562. The lights can convey information such as that the lamina supply(s) have run out, the lamina path is jammed, on/off, and the like. Further, case 560 as shown in FIG. 20 is provided with lid 564 which is pivotably openable so that lamina processing assemblies 16 and 402 are easily accessible. To keep apparatus 10 in case 560 cool, a conventional fan, such as a "muffin" fan used in computers and widely known in the art is provided in case 560. Referring to FIG. 11, fan case 580 is installed within apparatus 10 to support such a fan (not shown). Electrical wires 582 are provided to supply power to the fan.

Figure 10:
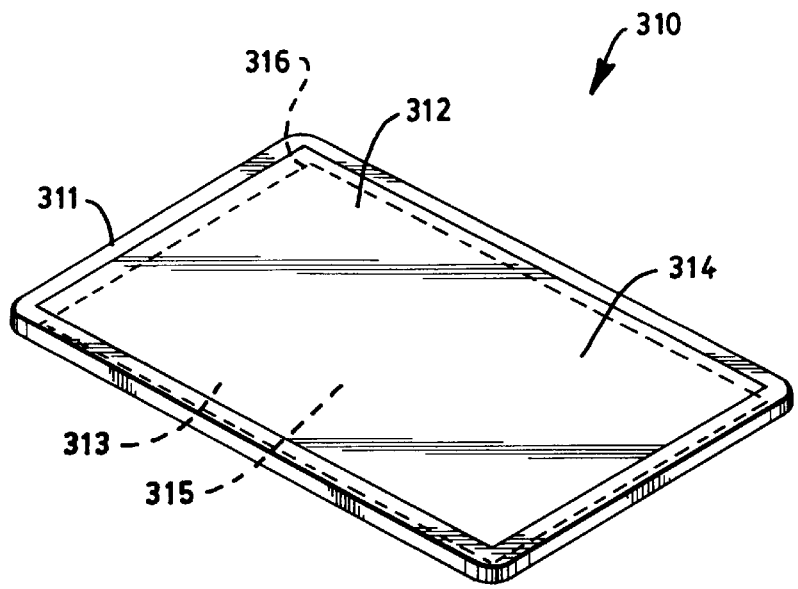
FIG. 10 is a perspective view of a second embodiment of a laminated substrate prepared in accordance with the present invention.

FIG. 10 shows a laminated substrate 310 prepared in accordance with the embodiment shown in FIGS. 11 and 12 of the present invention. Laminated substrate 310 includes card shaped substrate 311 having faces 312 and 313. Substrate 311 may be made from a variety of materials such as, for example, paper, cardboard, plastic, metal, or the like. Faces 312 and 313 may include information such as photographs, other graphics, text, data, such as appears on the front of a drivers license, for example. Back face 313 may include information such as that printed on the back of a credit card and may include a magnetic strip. Laminate sheet 314 is bonded to top face 312 whereas bottom laminate sheet 315 is bonded to bottom face 313. Corners 316 are angular, not rounded, and are most typically substantially square. Square corners result when cutters 416 and 474 are used to cut lamina 18 and lamina 406, respectively. Advantageously, top laminate sheet 314 is slightly more narrow and slightly shorter than face 312 in order to ease registration of laminate sheet 314 onto face 312. For example, use of a laminate sheet 314 which is ⅛ inch shorter and ⅛ inch more narrow than substrate 311 has been found to be suitable in the practice of the present invention. Although not shown in the figures, the top or bottom laminate sheet of the present invention can be substantially more narrow than card 311, for example as is needed when a magnetic strip is located on the bottom surface of the substrate. Similarly, the top and bottom laminate sheets may be comprised of different materials, have different widths as noted, have different thicknesses, and different printing thereon. Yet, as shown in FIGS. 11 and 12, both the top and bottom surfaces of the substrate are laminated in a single pass of the substrate along substrate path 92.

Having described the parts and operation of apparatus 10 in detail for two working embodiments, alternate embodiments are now presented. In the following alternate embodiments, only those features which differ significantly from those embodiments already presented will be discussed in detail. Identical or substantially similar parts are given like part numbers throughout.

FIG. 21 illustrates a double-side laminating apparatus 10 having a single lamina supply with a lamina supply route comprising a single lamina path. Apparatus 10 shown in FIG. 21 includes lamina processing assembly 602 comprising lamina supply member 604 and lamina supply 606. An almost depleted lamina supply is shown at 607. Lamina supply route 608 starts at lamina member 604 and proceeds to a first set of conveyor rollers 610 and 612. A rotary cutter 613, identical to rotary cutters 416 and 474, is positioned along lamina supply route 608 after rollers 610 and 612. Lamina guides 614 are disposed along lamina supply route 608 as shown. Lamina guides 614 are suitable pieces of metal such as metal wire which keep the lamina within supply route 608. FIG. 22 shows roller 616 and 617 with guides 614 placed in alignment with grooves 618 provided in rollers 616 and 617. Grooves 618 provided in the conveyor rollers prevent the guides 614 from interfering with the "pinching" of the lamina accomplished by rollers such as rollers 616 and 617 when a lamina sheet is conveyed therebetween. Lamina guides 614 are placed along the entire length of supply route 608 as shown in FIG. 21.

Continuing along supply route 608, conveyor rollers 616 and 617 are disposed downstream of cutter 413. Identical to previously discussed embodiments, roller pair 610 and 612 rotates slightly slower than roller pair 616 and 617 in order to remove, or "take up" any wrinkles, or "slack" appearing in lamina supply 606. Sensor 620 is positioned along route 608 to detect a reference on lamina 606, such as a leading edge or UV marking, for example. After sensor 620, lamina supply route crosses substrate path 92 as shown. Thus, cut laminate sheets can be conveyed across substrate path 92.

Conveyor roller pair 622, 624 receive laminate sheets as they cross path 92 and are fed through lamina guides 614. Unlike the previously described embodiments wherein each pair of conveyor rollers had only one roller connected to a magnetic clutch, rollers 622 and 624 are both selectively clutch driven. Roller 622 is provided with a magnetic clutch whose engagement causes rotation of roller 622 in the direction shown by arrow 628. That is, when the magnetic clutch connected to roller 622 is engaged, roller 622 rotates in a direction that conveys a cut laminate sheet downward, away from substrate path 92. Conversely, roller 624 is provided with a magnetic clutch whose engagement causes rotation of roller 624 in the direction shown by arrow 626. That is, when the magnetic clutch connected to roller 624 is engaged, roller 624 rotates in a direction that conveys a cut laminate sheet upward, toward substrate path 92. The respective magnetic clutches for rollers 622 and 624 are never simultaneously engaged. Instead, when the magnetic clutch connected to roller 622 is engaged, the clutch connected to roller 624 is disengaged, and roller 624 is therefore free to rotate correspondingly with roller 622 by the meshing of gears in a drive train (not shown). Similarly, when the magnetic clutch connected to roller 624 is engaged, the clutch connected to roller 622 is disengaged, and roller 622 is therefore free to rotate correspondingly with roller 624 by the meshing of gears in a drive train (not shown). Thus, depending upon whether roller 622 or alternatively roller 624 is engaged, the cut lamina sheet will be either conveyed downward or upward, respectively.

Sensor 630 is disposed below rollers 622 and 624 along supply route 608 as shown in FIG. 21. Sensor 630 is the same type of sensor as sensor 88 shown in FIG. 1 and can be used to detect a reference on the cut laminate sheet, in this embodiment preferably a leading edge.

Supply route 608 includes turning point 632, at which point the direction of the lamina conveyed along supply route 608 reverses. That is, at turning point 632, the lamina supply route is redirected upward toward substrate path 92. When the supply route 608 again meets substrate path 92, the laminate sheet is directed toward conveyor roller pair 634, 636, allowing the adhesive coated side of the cut sheet of laminate to face upwardly, as explained in more detail below. Continuing along substrate supply path 92 for the moment, roller pair 634, 636 perform similar functions as do roller pairs 140, 142 shown in FIG. 1 and 490, 492 shown in FIG. 11. Conveyor rollers 634, 636 form convergence zone 638, wherein a substrate card, a top cut laminate sheet and a bottom cut laminate sheet are registrably brought together.

Continuing downstream along substrate path 92, bonding station 640 is located, comprised of top heated roller 642 and bottom heated roller 644, each of which has an outer circumferential surface substantially aligned with substrate path 92. Thus, roller pair 642, 644 applies heat and pressure to the top and bottom of a substrate card, on the top and bottom of which are placed corresponding cut laminate sheets. As the substrate card and cut laminate sheets are conveyed through heated bonding station 640, the top and bottom cut laminate sheets are simultaneously bonded to successive portions of the substrate card. Card straightener 194 is positioned along substrate path 92 following bonding station 640, and before exit 150. Card straightener 194 is the same card straightener described above for the embodiment shown in FIG. 1 and the embodiment shown in FIG. 11.

The double sided lamination operation of apparatus 10 is now explained. Preparation of an empty machine 10 begins with the loading of lamina supply member 604 with a roll of lamina 606. The lamina is hand-fed to roller pair 610, 612 whereby the leading edge of the lamina supply is inserted therebetween. The machine is then switched on, whereupon the rollers 610, 612, 616, and 617 are engaged, thereby conveying the lamina downstream between roller pair 610, 612, through cutter 613, lamina guides 614 and roller pair 616, 617. The sensor positions are adjustable. Sensor 620 detects a reference of lamina 606, preferably the leading edge in this embodiment, whereupon conveyor rollers 610, 612, 616 and 617 are stopped. The lamina supply is thus momentarily stationary and during this time, the blade of rotary cutter 613 rotates and thereby cuts a sheet of laminate. A cut laminate sheet is then ready for either the top or the bottom of the substrate card. Because initially there is no lamina in the supply route between roller pair 622, 624 and turning point 632, sensor 630 produces a "lamina empty" signal and the laminate sheet is therefore conveyed across substrate path 92 into lamina guides 614. The conveyance of the cut laminate sheet is done by engaging roller pair 616, 617 and clutch driven roller 622. Because clutch driven roller 622 is engaged, and not clutch driven roller 624, the roller pair 622, 624 will rotate in the direction shown by arrow 628, thereby conveying the cut laminate sheet downward along route 608, toward turning point 632. The laminate sheet is conveyed through roller pairs 622, 624 downward along supply route 608 until sensor 630 detects a reference on the laminate sheet, such as the leading edge or the laminate sheet, whereupon clutch driven roller 622 is disengaged and roller pair 622, 624 is therefore stopped.

In the meantime, roller pair 610, 612 conveys lamina supply 606 having a new leading edge downstream through cutter 613, lamina guides 614 and roller pair 616, 617. Sensor 620 again detects the leading edge of lamina 606, whereupon conveyor rollers 610, 612, 616 and 617 are stopped. The lamina supply is thus momentarily stationary and during this time, the blade of rotary cutter 613 rotates and thereby cuts a second sheet of laminate. After this second cut, unlike the first cut, sensor 630 still "senses" the presence of the first cut laminate sheet disposed along supply route 608 between roller pair 622, 624 and turning point 632. In response, the second cut laminate sheet remains stationary, the leading edge of which remains aligned with sensor 620. Apparatus 10 is then ready to receive a substrate card to be laminated on top and bottom sides. In steady state operation, as discussed above, the preparation of cut laminate sheets is much faster than the speed at which substrate cards can be printed. Therefore, except during initial preparation, apparatus 10 must "wait" for a card to be fed into entry 94. As mentioned above, to save energy and reduce noise, motor 530 of apparatus 10 is shut off and goes into "sleep" mode after both top and bottom laminate sheets are ready and then awaits the entry of a substrate card in entrance 94.

Upon entry of a substrate card into entry 94, "wake-up" sensor 401 detects a reference, such as a leading edge on a substrate card, and turns on motor 530, whereby substrate path 92 begins to convey the substrate card. Conveyance of a substrate along path 92 is thus begun when the clutch driven sprocket and gear assemblies actuate rollers 108, 104 and 102 as shown in FIG. 21. The substrate card enters apparatus 10 through substrate entry zone 94 and may be fed into apparatus 10 in any desired manner. For example, the substrate may be hand fed into apparatus 10 or alternatively, may be automatically fed into apparatus 10 directly from a suitable device, such as a printer. As the substrate enters apparatus 10, a deflection plate (not shown) biases the substrate against endless loop drivers 106 and 107 which convey the substrate along substrate supply path 92 between conveyor rollers 108 and 104.

Referring to FIG. 21, when the substrate is conveyed far enough along the substrate supply path 92, sensor 134 detects the presence of the substrate. Sensor 134 is the same sensor shown in FIG. 1 and FIG. 11 and whose operation is described above. When sensor 134 detects the substrate, clutch-driven roller 616 is engaged, thereby conveying the second cut sheet of laminate between rollers 616 and 617 downward along supply route 608. At the same time, the substrate continues along path 92 so that the leading edge of the substrate is brought into registration with the leading edge of the top sheet of laminate. However, the leading edge of the substrate is advanced slightly beyond the leading edge of the laminate when they are brought together along supply path 92. In this manner, the top cut sheet of laminate cannot cross substrate path 92 because the substrate card prevents such crossing. Further, as noted above and shown in FIGS. 9 and 10, the present invention is designed so that the laminate sheets do not extend to the edges of the substrate card. Instead, there is a slight area around the perimeter of the substrate cards that is not laminated.

Roughly at the same time clutch-driven roller 616 is engaged, clutch driven roller 624 is also engaged, causing rotation of conveyor rollers 622 and 624 to convey the bottom laminate sheet upward, toward supply path 92. At the same time, as noted, the substrate continues along path 92 so that the leading edge of the substrate is brought into registration with the leading edge of the bottom sheet of laminate. As with the top cut sheet of laminate, the leading edge of the substrate is advanced slightly beyond the leading edge of the laminate when they are brought together along supply path 92. In this manner, the bottom sheet of laminate cannot cross substrate path 92 because the substrate card prevents such crossing.

From the above discussion, it can be understood that the movement of the top and bottom laminate sheets is coordinated with the movement of the substrate so that the lamina sheets are conveyed from supply route 608, to substrate path 92, and in turn, to convergence zone 638 at substantially the same time while being transported at substantially the same speed. It can also be understood that the adhesive coating on both cut laminate sheets is facing the substrate, as is needed in order for the sheets to be bonded to the substrate. As the top and bottom laminate sheets and the substrate pass between conveyor rollers 634 and 636, successive portions of the laminate sheets and the substrate are brought into contact. A substrate bearing laminate sheets on both top and bottom sides then emerges from between conveyor, or "pinch" rollers 634 and 636 and is next conveyed to bonding station 640 whereupon it is conveyed through heated roller pair 642, 644. As the top laminate sheet and the bottom laminate sheet are pressed into the substrate, heat from heated rollers 642 and 644 activates the adhesive on the top and bottom laminate sheets in order to bond the laminate sheets to the substrate.

Upon emerging from bonding station 640, the substrate with newly laminated top and bottom surfaces is conveyed along path 92 Given the characteristics of particular lamina supply 606 and substrate used, the laminated products produced may tend to be characterized either by a convex or concave bend. If this happens, card straightener 194 may be adjusted to apply an appropriate reverse bend to the laminated product before the laminated product leaves apparatus 10 through exit zone 150, as discussed above. Subsequent laminated products are formed from lamina 606 and additional substrates by repeating these operations. Specifically, newly cut sheets from supply 606 are advanced, cut, and positioned in a "ready" position. The apparatus 10 is then powered down and awaits an additional substrate to be placed into entry 94, whereupon "wake-up" sensor 401 senses the substrate and restarts motor 530.

Figure 23:
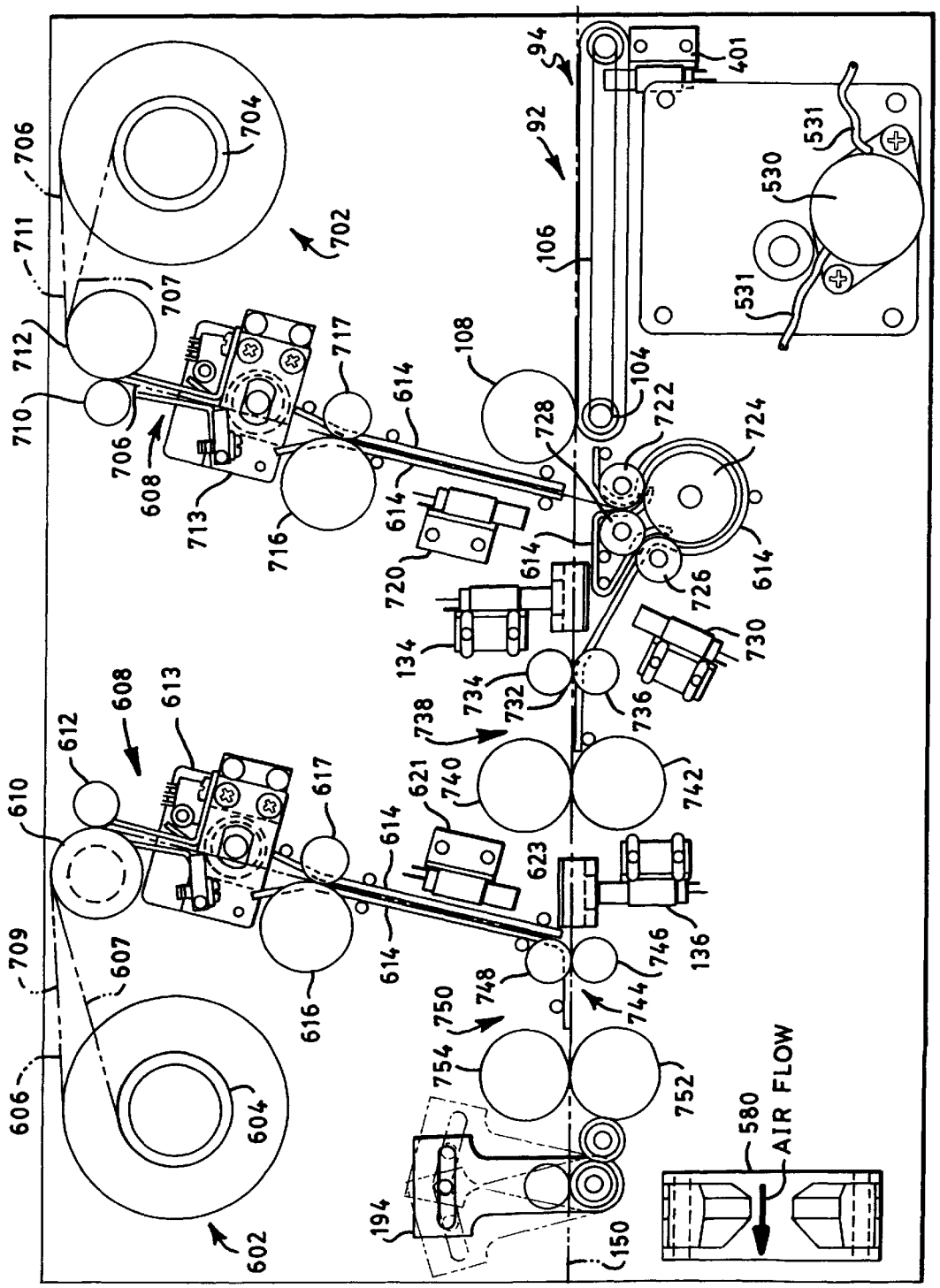
FIG. 23 is a plan view showing a fourth embodiment of a lamina processing assembly in accordance with the present invention.

Another embodiment of the present invention using a separate upper and lower lamina supply is shown in FIG. 23. The embodiment shown in FIG. 23 differs primarily from the embodiment shown in FIG. 11 in that both upper lamina supply 606 and lower lamina supply 706 are disposed at the top of apparatus 10. Thus, both lamina supply rolls can be accessed from the top of the apparatus.

Referring now to FIG. 23, apparatus 10 includes upper lamina processing assembly 602 comprising lamina supply member 604 and upper lamina supply 606. An almost depleted lamina supply is shown at 607. In this embodiment lamina supply route 608 includes both upper lamina supply path 709 and lower lamina supply path 711. Upper lamina supply path 709 starts at lamina member 604 and proceeds to a first set of conveyor rollers 610 and 612. Rotary cutter 613 is positioned along lamina supply path 709 below rollers 610 and 612. Lamina guides 614 are disposed along lamina supply route 608 as shown.

Continuing along supply path 709, conveyor rollers 616 and 617 are disposed downstream of cutter 413. As in previously discussed embodiments, roller pair 610 and 612 rotates slightly slower than does roller pair 616 and 617 in order to remove, or "take up" any wrinkles, or "slack" appearing in lamina supply 606. Sensor 621 is positioned along route 608 to detect a reference on lamina 606, such as a leading edge or UV marking, for example. Sensor 621 shown in FIG. 23 is configured slightly differently than sensor 620 shown in FIG. 21, in that sensor 621 has the longitudinal axis of sensing element positioned substantially parallel to the direction of lamina supply path 709. However, sensors 620 and 621 are otherwise identical.

Apparatus 10 shown in FIG. 23 also includes lower lamina processing assembly 702 comprising lamina supply member 704 and lower lamina supply 706. An almost depleted lamina supply is shown at 707. Lamina supply route 608 includes lower lamina supply path 711. Lower lamina supply path 711 starts at lamina member 704 and proceeds to a first set of conveyor rollers 710 and 712. Rotary cutter 713 is positioned along lower lamina supply path 711 below rollers 710 and 712. Conveyor rollers 716 and 717 are disposed downstream of cutter 713. As in previously discussed embodiments, roller pair 710 and 712 rotates slightly slower than does roller pair 716 and 717 in order to remove, or "take up" any wrinkles, or "slack" appearing in lamina supply 706. Sensor 720 is positioned along route 608 to detect a reference on lamina 706, such as a leading edge or UV marking, for example. Lower lamina supply path 711 crosses substrate path 92 as shown in FIG. 23. Through a combination of shaped lamina guides 614 and rollers 722, 724, 726 and 728, lower lamina supply path 711 "loops" around and feeds into substrate path 92 as shown in FIG. 23. Sensor 730 is positioned at the end of lower lamina supply path 711 such that it can detect a reference on lamina 706 and provide a signal to stop the conveyance of the cut laminate sheet by rollers 722, 724, 726 and 728.

Substrate path 92 shown in FIG. 92 is similar to the substrate paths disposed in previously discussed embodiments. Substrate path 92 includes entry 94 and conveyors 106 and 107, as well as roller pair 104, 108 for conveying the substrate. "Wake-up" sensor 401 is positioned along substrate supply path 92 at entry 94. Sensor 401 detects when a reference on the substrate is positioned in line with sensor 401. Sensor 134 is disposed along substrate path 92 for detecting a reference on the substrate, such as a leading edge, and its position is coordinated with the position of sensor 730 so that the substrate and a bottom laminate sheet arrive at convergence zone 732 in a manner which allows the substrate and the laminate sheet to be brought together in proper registration. As shown in FIG. 23, convergence zone 732 includes roller pair 734, 736 wherein a substrate card and a bottom cut laminate sheet can be registrably be brought into contact and further conveyed along substrate path 92.

Bonding station 738 is disposed along path 92 and is comprised of roller 740 on a top side of substrate path 92 and heated roller 742 on the bottom side of substrate path 92. As the laminate bearing substrate is conveyed along path 92, pressure is applied from rollers 740 and 742 whereas heat which activates the adhesive in the laminate is supplied from roller 742, thereby bonding a laminate sheet to the bottom surface of the substrate as it passes through bonding station 738. Beyond bonding station 738, a sensor 136 is disposed. Sensor 136 is substantially identical to sensor 134, except that sensor 136 is positioned in an opposite direction relative to substrate path 92 than is sensor 134. Sensor 136, like sensor 134, detects a reference on the substrate. Convergence zone 744 is similar to convergence zone 738 and includes conveyer rollers 746 and 748. In convergence zone 744, a top sheet of laminate supplied from supply path 709 is brought into registrable contact with the top surface of the substrate whereupon conveying rollers 746 and 748 transport the bottom laminated substrate and top lamina sheet to bonding station 750. Bonding station 750 is comprised of top heated roller 754 and lower roller 752. Notably, bonding station 750 is similar to bonding station 738 except that in bonding station 750 the position of the heated roller is on the top of path 92 so that the top laminate sheet may be bonded to the top of the substrate. In the practice of the present invention, heated roller 754 is preferably set to a lower temperature than is heated roller 742. The substrate retains considerable residual heat after if passes through bonding station 738 and bonding station 750 can therefore be preset to a lower temperature. As the top substrate sheets and correspondingly aligned substrates pass through bonding station 750, heat is transferred from heated roller 754 to the top laminate sheets and such heat activates the adhesive on the lamina sheets so that the laminate sheets bond to the top surface of the substrate. A card straightener 194 is positioned along substrate path 92 before exit 150. As discussed above, card straightener 194 can be adjusted to correct the "cargoing" of newly laminated substrate cards.

The operation of apparatus 10 shown in FIG. 23 is now explained. Preparation of an empty machine 10 begins with the loading of lamina supply members 604 and 704 with a rolls of lamina 606 and 706. The lamina 606 is hand-fed to roller pairs 610, 612 and the leading edge of the lamina supply is inserted therebetween. Similarly, lamina 706 is hand-fed to roller pairs 710, 712 and the leading edge of the lamina supply 706 is inserted therebetween. The machine is then switched on, whereupon the rollers 610, 612, 616, and 617 are engaged, thereby conveying the lamina 606 downstream between roller pair 610, 612, through cutter 613, lamina guides 614 and roller pair 616, 617. Sensor 621 detects a reference of lamina 606, preferably the leading edge in this embodiment, whereupon conveyor rollers 610, 612, 616 and 617 are stopped. The lamina supply is thus momentarily stationary and during this time, the blade of rotary cutter 613 rotates and thereby cuts a sheet of laminate.

A cut laminate sheet is then ready for the top of the substrate card. Similarly, rollers 710, 712, 716, and 717 are engaged, thereby conveying the lower lamina 706 downstream between roller pair 710, 712, through cutter 713, lamina guides 614 and roller pair 716, 717. Sensor 720 detects a reference of lamina 706, preferably the leading edge in this embodiment, whereupon conveyor rollers 710, 712, 716 and 717 are stopped. The lamina supply is thus momentarily stationary and during this time, the blade of rotary cutter 713 rotates and thereby cuts a sheet of laminate.

The cut sheet of laminate in supply path 711 is then conveyed across substrate path 92 by conveyors 716 and 717 into lamina guides 614 and thereby guided between rollers 722 and 728. The direction of rotation of roller 722 is always counter-clockwise so that the cut laminate sheet is further conveyed between rollers 722 and 724 and around roller 724 with the aid of guides 614. As the cut laminate sheet completes its movement around roller 724, the sheet is fed between rollers 726 and 728, directed by guides 614. Sensor 730 then detects a reference on the bottom laminate sheet whereupon the conveyance of the bottom sheet is stopped. Conveniently, rollers 722, 724, 726 and 728 rotate in unison and have correspondingly meshed gears (not shown). Thus, with the arrangement of rollers 722, 724, 726, 728 shown in FIG. 23, only one gear corrsponding to such rollers need be clutch-driven. The three remaining gears can be powered from the one clutch-driven gear.

Having cut two laminate sheets and positioned them as described in lamina paths 709 and 711, respectively, apparatus 10 is ready to receive a substrate card to be laminated on top and bottom sides. In steady state operation, as discussed above, the preparation of cut laminate sheets is much faster than the speed at which substrate cards can be printed. Therefore, except during initial preparation, apparatus 10 must "wait" for a card to be fed into entry 94. As mentioned above, to save energy and reduce noise, motor 530 of apparatus 10 is shut off and goes into "sleep" mode after both top and bottom laminate sheets are ready and awaits the entry of a substrate card in entrance 94.

Upon entry of a substrate card into entry 94, "wake-up" sensor 401 detects a reference, such as a leading edge on a substrate card, and turns on motor 530, whereby substrate path 92 begins to convey the substrate card. Conveyance of a substrate along path 92 is thus begun when the clutch driven sprocket and gear assemblies actuate rollers 108, 104 and 102 as shown in FIG. 23. The substrate card enters apparatus 10 through substrate entry zone 94 and may be fed into apparatus 10 in any desired manner. As the substrate enters apparatus 10, a deflection plate (not shown) biases the substrate against endless loop drivers 106 and 107 which convey the substrate along substrate supply path 92 between conveyor rollers 108 and 104.

Referring to FIG. 23, when the substrate is conveyed far enough along the substrate supply path 92, sensor 134 detects the presence of the substrate. Sensor 134 is the same sensor used with sensor 134 shown in FIGS. 1, 11, and 21 and whose operation is described above. When sensor 134 detects the substrate, clutch-driven rollers 722, 724, 726 and 728 are engaged, thereby conveying the bottom cut sheet of laminate toward convergence zone 732. At the same time, the substrate continues along path 92 so that the leading edge of the substrate is brought into registration with the leading edge of the bottom sheet of laminate. When this happens, both the substrate and the lamina sheet are conveyed into convergence zone 732 between roller 734 and 736 at substantially the same time while being transported at substantially the same speed.

Meanwhile, rollers 740, 742, 746, 748, 754 and 752 are rotatably driven by corresponding components of the gear drive train (not shown), and rotation of these rollers conveys the substrate and laminate along the substrate path 92. As the bottom laminated sheet and the substrate pass between conveyor rollers 734 and 736, successive portions of the bottom laminate sheet and the substrate are brought into contact. A substrate bearing a laminate sheet on its bottom then emerges from between pinch rollers 734 and 736 and is next conveyed to bonding station 738 where it is conveyed between and through heated roller 742 and roller 740. As the bottom laminate sheet and the substrate are pressed together, heat from heated roller 742 activates the adhesive on the bottom laminate sheet in order to bond the laminate sheet to the substrate.

Upon emerging from bonding station 738, the substrate with a newly laminated bottom surface is conveyed along path 92 and is detected by sensor 136. When this happens, roller 616 is engaged and the top laminate sheet is conveyed out from upper lamina path 709 and into convergence zone 744. At the same time, the bottom laminated substrate continues along path 92 so that the leading edge of the substrate is brought into registration with the leading edge of the top sheet of laminate. When this happens, both the substrate and the laminate sheet are conveyed into convergence zone 744 between rollers 746 and 748 at substantially the same time while being transported at substantially the same speed.

Rotation of rollers 746, 748, 754 and 752 conveys the substrate and laminate along the substrate path 92. As the top laminate sheet and the substrate pass between conveyor rollers 746 and 748, successive portions of the top laminate sheet and the substrate are brought into contact. A substrate bearing a laminate sheet on its top then emerges from between pinch rollers 746 and 748 and is next conveyed to bonding station 750 where it is conveyed between and through heated roller 754 and roller 750. As the top laminate sheet and the substrate are pressed together, heat from heated roller 754 activates the adhesive on the top laminate sheet in order to bond the laminate sheet to the substrate. Upon emerging from bonding station 750, the substrate with a newly laminated top surface and previously laminated bottom surface is conveyed along path 92 and is detected by sensor 136.

Given the characteristics of the particular upper lamina 606, lower lamina 706 and substrate used, the laminated products produced may tend to be characterized either by a convex or concave bend. If this happens, card straightener 194 may be adjusted to apply an appropriate reverse bend to the laminated product before the laminated product leaves apparatus 10 through exit zone 150. Subsequent laminated products are formed from lamina 606, lamina 706 and additional substrates by repeating these operations. Specifically, newly cut sheets from the upper and lower supplies are advanced and cut, and apparatus 10 is powered down, awaiting an additional substrate to be placed into entry 94, whereupon "wake-up" sensor 401 senses the substrate and restarts motor 530.

Figure 24:
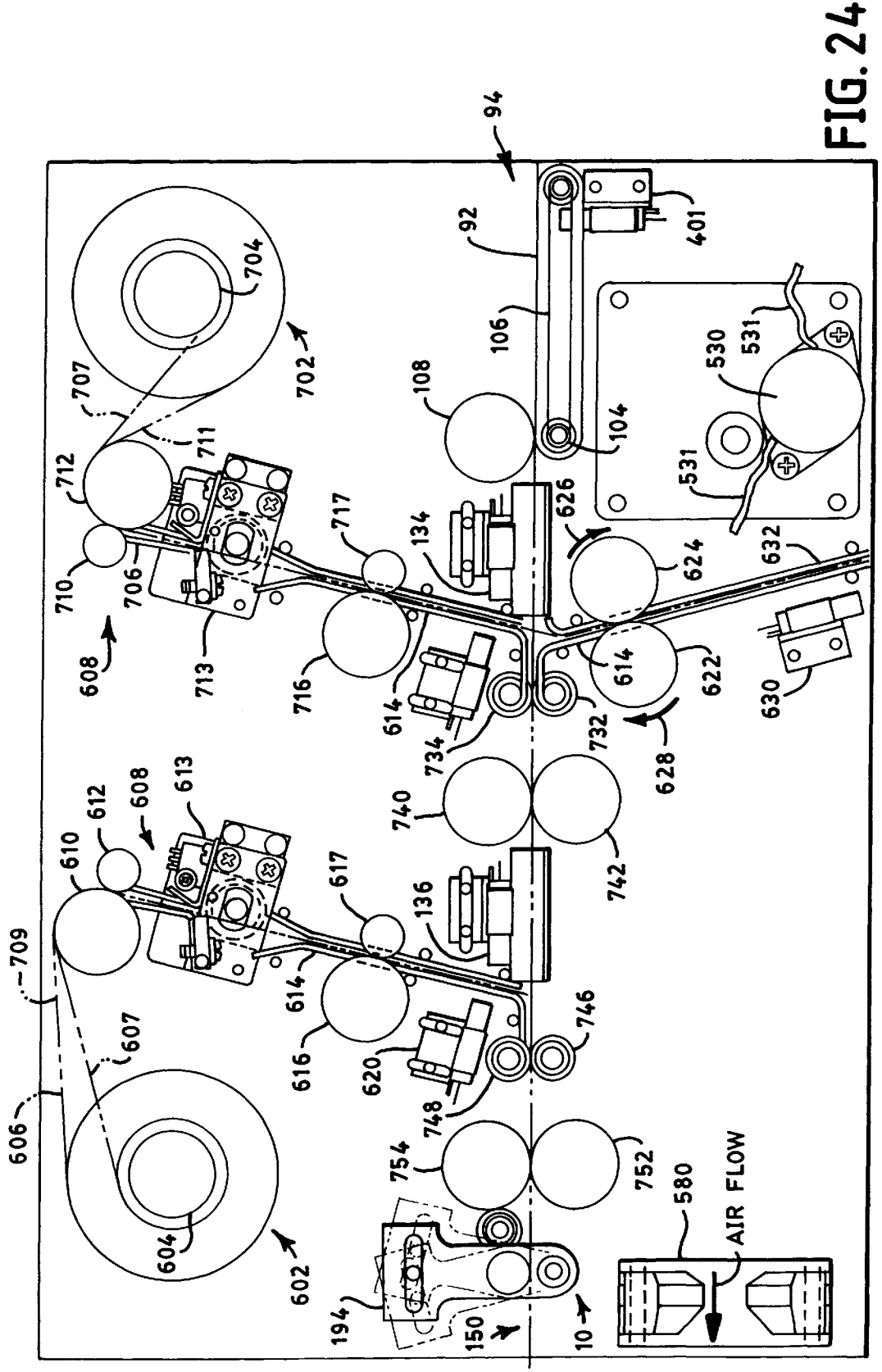
FIG. 24 is a plan view showing a fifth embodiment of a lamina processing assembly in accordance with the present invention.

Another embodiment of the present invention is shown in FIG. 24. The top and bottom side laminating apparatus 10 shown in FIG. 24 is similar to the embodiment shown in FIG. 23. Both of these embodiments show a laminating apparatus 10 which successively laminates bottom and top sides of a substrate card. The embodiment shown in FIG. 24 differs from that shown in FIG. 23 in that lower lamina supply path 711 includes a turning point substantially the same as that included in the embodiment shown in FIG. 21.

Referring to FIG. 24, the bottom lamina supply 706 is installed on member 704 so that the adhesive side of lamina 706, which is on the outside of supply roll 706, will be facing the substrate card when they are brought into registration.

In operation, the bottom lamina supply is cut by cutter 713 and the resulting cut laminate sheet is then conveyed across substrate path 92 until it is detected by sensor 630. Once sensor 630 detects the laminate sheet, roller 622 is disengaged, whereby conveyance of the laminate sheet is stopped. Unlike the embodiment shown in FIG. 21, wherein a second sheet is then cut by the same cutter, in the embodiment shown in FIG. 24, only one laminate sheet is cut by cutter 713 per substrate card. The cut sheet is then conveyed to a waiting position between roller pair 622, 624 and turning point 632. The top lamina supply path 709 as well as substrate path 92 function substantially the same as discussed in the embodiment depicted in FIG. 23.

Figure 25:
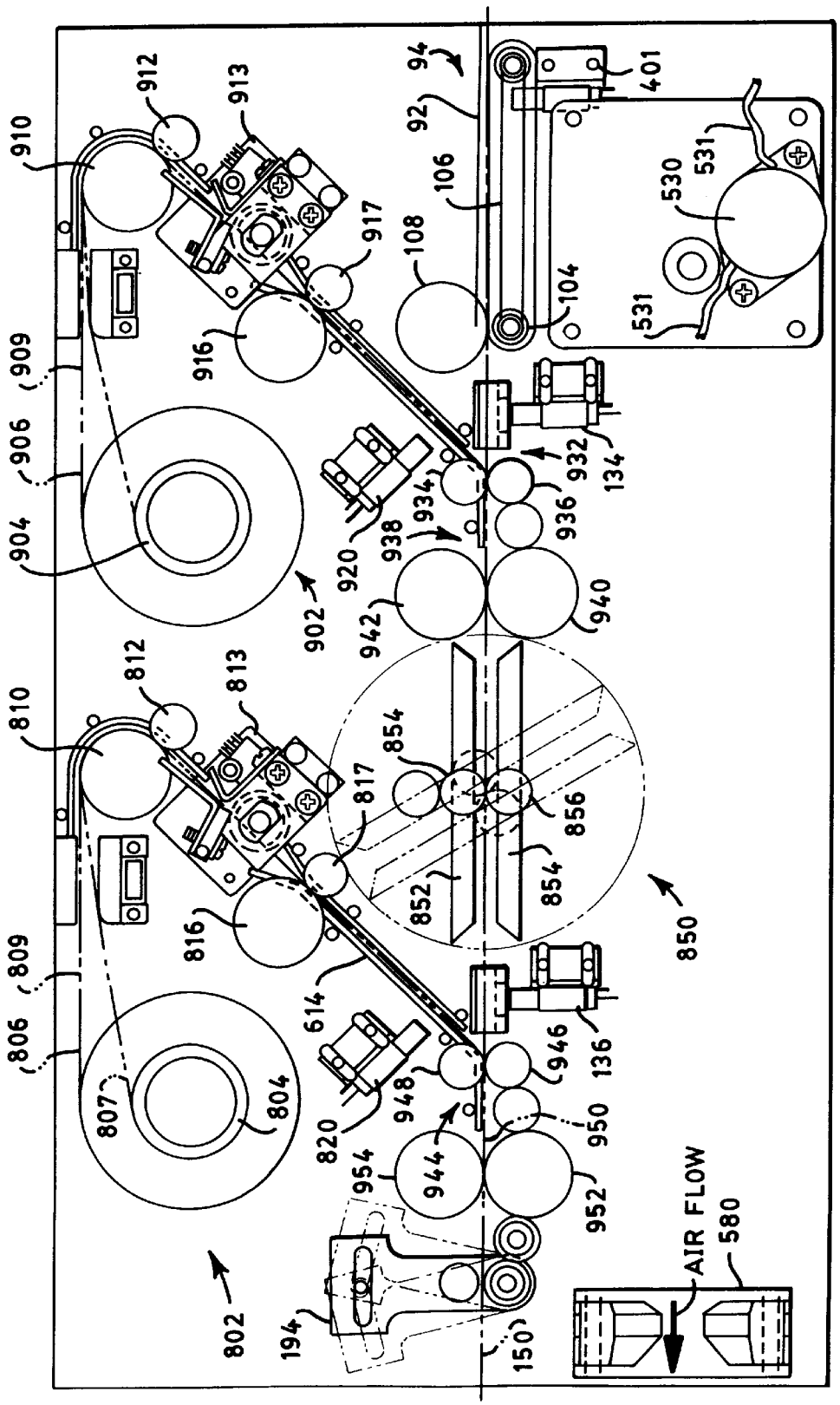
FIG. 25 is a plan view showing a sixth embodiment of a lamina processing assembly in accordance with the present invention.

FIG. 25 shows yet another embodiment of the present invention in which a "card flipper" is employed. Referring now to FIG. 25, apparatus 10 includes lamina processing assembly 802 comprising lamina supply member 804 and first lamina supply 806. An almost depleted lamina supply is shown at 807. In this embodiment, the lamina supply route includes both the first lamina supply path 809 and the second lamina supply path 909. First lamina supply path 809 starts at lamina member 804 and proceeds to a first set of conveyor rollers 810 and 812. Rotary cutter 813 is positioned along lamina supply path 809 below rollers 810 and 812. Lamina guides 614 are disposed along the lamina supply route as shown. Conveyor rollers 816 and 817 are disposed downstream of cutter 813. As in previously discussed embodiments, roller pair 810 and 812 rotate slightly slower than does roller pair 816 and 817 in order to remove, or "take up" any wrinkles, or "slack" appearing in lamina supply 806. Sensor 820 is positioned along path 809 to detect a reference on lamina 806, such as a leading edge or UV marking, for example.

Apparatus 10 shown in FIG. 25 also includes second lamina processing assembly 902 comprising lamina supply member 904 and second lamina supply 906. An almost depleted lamina supply is shown at 907. Second lamina supply path 909 starts at lamina member 904 and proceeds to a first set of conveyor rollers 910 and 912. Rotary cutter 913 is positioned along lamina supply path 909 below rollers 910 and 912. Conveyor rollers 916 and 917 are disposed downstream of cutter 913. As in previously discussed embodiments, roller pair 910 and 912 rotate slightly slower than does roller pair 916 and 917 in order to remove, or "take up" any wrinkles, or "slack" appearing in lamina supply 906. Sensor 920 is positioned along path 909 to detect a reference on lamina 906, such as a leading edge or UV marking, for example.

Substrate path 92 shown in FIG. 25 is similar to the substrate paths discussed in previously discussed embodiments. Substrate path 92 includes entry 94 and conveyors 106 and 107, as well as roller pair 104, 108 for conveying the substrate. "Wake-up" sensor 401 is positioned along substrate supply path 92 at entry 94. Sensor 401 detects when a reference on the substrate is positioned in line with sensor 401. Sensor 134 is disposed along substrate path 92 for detecting a reference on the substrate, such as a leading edge, and the position of the leading edge is coordinated with the position of sensor 920 so that the substrate and a laminate sheet arrive at convergence zone 932 in manner which allows the substrate and the laminate sheet to be brought together in proper registration. As shown in FIG. 25, convergence zone 932 includes roller pair 934, 936 wherein a substrate card and a cut laminate sheet can be registrably be brought into contact and further conveyed along substrate path 92.

Bonding station 938 is disposed along path 92 and is comprised of roller 940 on a bottom side of substrate path 92 and heated roller 942 on the top side of substrate path 92. As the laminate bearing substrate is conveyed along path 92, pressure is applied from rollers 940 and 942 whereas heat which activates the adhesive in the laminate is supplied from roller 942, thereby bonding a laminate sheet to a first surface of the substrate as it passes through bonding station 938.

Unique to the embodiment depicted in FIG. 25 is card flipper 850 which is rotatably disposed about substrate path 92. Card flipper 850 includes a pair of guide members 852, 854. Guide members 852 and 854 are connected to gears 854 and 856, respectively. Rotation of gears 854 and 856 in turn rotates guides 852 and 854 through 180° so that a substrate card can be "flipped," thereby allowing the first and second lamina supply path to both be disposed in the top part of apparatus 10. Card flipper 850 also includes a sensor (not shown) which detects a suitable reference on the substrate, such as a leading edge. The sensor is positioned within card flipper 850 so that when the sensor detects the reference, the substrate is positioned completely within the limits of guides 852 and 854. In operation, when the sensor detects the substrate, the conveying rollers along path 92 are disengaged, whereupon card flipper 850 flips the substrate card 180° for subsequent lamination of the yet un-laminated side.

Beyond card flipper 850 is disposed sensor 136. Sensor 136 is substantially identical to sensor 134, and because of the presence of card flipper 850, sensor 136 is positioned in the same direction relative to substrate path 92 as is sensor 134. Sensor 136, like sensor 134, detects a reference on the substrate. Convergence zone 944 is similar to convergence zone 938 and includes conveyer rollers 946 and 948. In convergence zone 944, a second sheet of laminate supplied from supply path 909 is brought into registrable contact with the top surface of the substrate whereupon conveying rollers 946 and 948 transport the substrate and second laminate sheet to bonding station 950. Bonding station 950 is comprised of top heated roller 954 and lower roller 952. Notably, bonding station 950 is similar to bonding station 938, and because of the presence of card flipper 850, the positions of the heated and non-heated rollers in bonding stations 938 and 950 relative to path 92 are the same. In the practice of the present invention, heated roller 954 is preferably set to a lower temperature than is heated roller 942. The substrate retains considerable residual heat after if passes through bonding station 938 and bonding station 950 can therefore be preset to a lower temperature. As the top substrate sheets and correspondingly aligned substrates pass through bonding station 950, heat is transferred from heated roller 954 to the top laminate sheets and such heat activates the adhesive on the lamina sheets so that the lamina sheets bond to the top surface of the substrate. A card straightener 194 is positioned along substrate path 92 before exit 150. As discussed above, card straightener 194 can be adjusted to correct the "cargo" effect of newly laminated substrate cards.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An apparatus for automatically laminating two sides of a generally planar substrate, said apparatus comprising:

a lamina supply route, a lamina supply member, said member capable of holding a webless supply of lamina material which can be cut into successive sheets of laminate;

a lamina conveyor disposed along said lamina supply route for transporting said laminate sheets;

a substrate path having an entry and an exit, a substrate conveyor being disposed along said substrate path, said substrate conveyor capable of transporting the substrate from said entry to said exit;

a convergence zone, said lamina supply route connecting to said substrate path in said convergence zone, a first side of the substrate being brought into registration with a first sheet of laminate in said convergence zone, a second side of the substrate being brought into registration with a second sheet of laminate in said convergence zone;

said substrate path including a bonding station, the first cut sheet of laminate being bonded to the first side of the substrate and the second cut sheet of laminate being bonded to the second side of the substrate in said bonding station, said substrate path including said convergence zone following said entry, said bonding station following said convergence zone and said exit following said bonding station, whereby the first and second sides of the substrate can both be laminated during a single pass of the substrate along the substrate path; and a lamina sensor disposed along said lamina supply route and in communication with said lamina conveyor, said lamina sensor capable of detecting a predetermined reference of the lamina and signaling said lamina conveyor in response to said detection.

2. The apparatus of claim 1, wherein said supply member comprises a plurality of supply members, said supply members each capable of holding a webless supply of lamina, each of the webless supplies possessing unique characteristic.

3. The apparatus of claim 1, wherein said lamina supply route comprises a first lamina supply path and a second lamina supply path.

4. The apparatus of claim 3, wherein said convergence zone further comprises:

first and second convergence zones, said first lamina supply path connecting to said substrate path in said first convergence zone, one of the first and second sides of the substrate being brought into registration with the first sheet of laminate in said first convergence zone; and said second lamina supply path connecting to said substrate path in said second convergence zone, the other one of the first and second sides of the substrate being brought into registration with the second sheet of laminate in said second convergence zone.

5. The apparatus of claim 3, wherein a cutter is disposed along said supply route for cutting lamina into successive sheets of laminate, said cutter comprising a first cutter disposed along said first lamina supply path and a second cutter disposed along said second lamina supply path.

6. The apparatus of claim 5, wherein said cutter is a motor driven rotary cutter.

7. The apparatus of claim 6, wherein said rotary cutter comprises:

a fixed cutting blade and a rotating cutting blade, said rotating cutting blade being rotatable from an open position through a cutting position and rotatably returning to said open position; and wherein at said open position, said lamina supply route extends between said fixed cutting blade and said rotating cutting blade; and at said cutting position, said rotating cutting blade cuttingly engages said fixed cutting blade.

8. The apparatus of claim 7, wherein said cutter further comprises a switch, said switch disengaging said cutter after one revolution of said cutting blade.

9. The apparatus of claim 1, wherein a cutter is disposed along said supply route for cutting lamina into successive sheets of laminate.

10. The apparatus of claim 1, further comprising a substrate sensor disposed along said substrate path, said substrate sensor in communication with said lamina conveyor, said substrate sensor capable of detecting a predetermined reference of the substrate and signaling said lamina conveyor.

11. The apparatus of claim 10, further comprising a controller, said controller communicating signals between said lamina sensor, said substrate sensor, said conveyors and said cutter.

12. The apparatus of claim 10, wherein said substrate sensor and said lamina sensor are positioned relative to one another such that, when said substrate sensor signals said lamina conveyor, a leading edge of the substrate and a leading edge of the laminate sheet are capable of being aligned, the laminate sheet being maintained in said alignment for further transportation along said substrate path.

13. The apparatus of claim 1, wherein said lamina supply route includes a turning point, whereby a direction of travel of a conveyed sheet of laminate can be reversed.

14. The apparatus of claim 1, wherein said lamina supply route crosses said substrate path.

15. The apparatus of claim 1, wherein said lamina conveyor is comprised of at least one pair of conveyor rollers said pair further comprising:

a first roller disposed above said lamina supply route, a circumferential limit of said first roller substantially coinciding with a plane tangent to said supply route;

a second roller disposed below said lamina supply route, a circumferential limit of said second roller substantially coinciding with said plane;

said first and second rollers rotatably driven, said rollers capable of engaging and conveying one of a lamina and a laminate sheet.

16. The apparatus of claim 15, wherein a first pair of rollers, said cutter, and a second pair of rollers are disposed sequentially along said lamina supply route.

17. The apparatus of claim 16, wherein said first pair rotates at a slower speed than said second pair, whereby slack in a supply of lamina is capable of being reduced.

18. The apparatus of claim 1, wherein said substrate path maintains the top side of the substrate continually facing substantially upward from said entry to said exit.

19. The apparatus of claim 1, wherein said substrate path includes a card flipper, said flipper capable of reversing the orientation of the top and bottom sides of the substrate.

20. The apparatus of claim 1, wherein said bonding station is comprised of a pair of rollers, said pair further comprising:

a first roller disposed adjacent a first side of said substrate supply path, a circumferential limit of said first roller substantially coinciding with a plane tangent to said substrate supply path;

a second roller disposed adjacent a second side of said substrate supply path, a circumferential limit of said second roller substantially coinciding with said plane;

one of said first and second rollers having a heating element;

said rollers being rotatably driven, said rollers capable of bonding a laminate sheet to one of the top and bottom sides of the substrate and advancing the laminated substrate along said substrate path.

21. The apparatus of claim 20, wherein said bonding station further comprises first and second pairs of rollers, one of said pairs bonding the first cut sheet of laminate to the first side of the substrate and the other of said pairs bonding the second cut sheet of laminate to the second side of the substrate.

22. The apparatus of claim 21, wherein said heating element of said first pair of rollers operates at one of a higher temperature and lower temperature than does said heating element of said second pair.

23. The apparatus of claim 1, wherein said bonding station is comprised of a pair of rollers, said pair further comprising:

a first roller disposed adjacent a first side of said substrate supply path, a circumferential limit of said first roller substantially coinciding with a plane tangent to said supply path;

a second roller disposed adjacent a second side of said substrate supply route, a circumferential limit of said second roller substantially coinciding with said plane;

said first and second rollers having a heating element;

said rollers being rotatably driven, said rollers capable of bonding the first and second laminate sheets to the first and second sides of the substrate respectively and advancing the laminated substrate along said substrate path.

24. The apparatus of claim 1, wherein said substrate conveyor includes at least one pair of rollers, said pair further comprising:

a first roller disposed adjacent a first side of said substrate supply path, a circumferential limit of said first roller substantially coinciding with a plane tangent to said supply path;

a second roller disposed adjacent a second side of said substrate supply path, a circumferential limit of said second roller substantially coinciding with said plane;

said rollers being rotatably driven, said rollers capable of advancing the substrate and laminated substrate along said substrate path.

25. The substrate conveyor of claim 24, further comprising a conveyor belt, said conveyor belt disposed along said substrate path.

26. An apparatus for automatically laminating two sides of a generally planar substrate, said apparatus comprising:

a lamina supply route, a lamina supply member, said member capable of holding a webless supply of lamina material which can be cut into successive sheets of laminate;

a lamina conveyor disposed along said lamina supply route for transporting said laminate sheets independently of said planar substrate;

a substrate path having an entry and an exit, a substrate conveyor being disposed along said substrate path, said substrate conveyor capable of transporting the substrate from said entry to said exit;

a convergence zone, said lamina supply route connecting to said substrate path in said convergence zone, a first side of the substrate being brought into registration with a first sheet of laminate in said convergence zone, a second side of the substrate being brought into registration with a second sheet of laminate in said convergence zone;

said substrate path including a bonding station, the first cut sheet of laminate being bonded to the first side of the substrate and the second cut sheet of laminate being bonded to the second side of the substrate in said bonding station, said substrate path including said convergence zone following said entry, said bonding station following said convergence zone and said exit following said bonding station, whereby the first and second sides of the substrate can both be laminated during a single pass of the substrate along the substrate path.

27. A process of making a plurality of laminated cards, the cards laminated on first and second sides, said process comprising the steps of:

(a) providing a webless supply of lamina from which a successive plurality of laminated sheets is cut, said lamina having a current leading edge;

(b) cutting through the lamina along a cutting line at a predetermined distance from a reference of the lamina to provide a first sheet of laminate wherein said cutting provides the laminate sheet with the trailing edge of the cutting line and wherein said cutting provides the lamina supply with the successive leading edge at the cutting line, and wherein there is no wasted lamina between the trailing edge of the laminate sheet and the successive leading edge of the lamina;

(c) repeating step (b) to produce a second sheet of cut laminate;

(d) bonding the first laminate sheet to a first side of a first card and bonding the second laminate sheet to a second side of the first card; and (e) following steps (b) through (d) a plurality of times to yield said plurality of cards laminated on first and second sides.

28. A process of making a plurality of laminated cards, the cards laminated on first and second sides, said process comprising the steps of:

(a) providing a webless supply of lamina from which a successive plurality of laminate sheets is cut, said lamina having a current leading edge;

(b) cutting through the lamina along a cutting line at a predetermined distance from a reference of the lamina to provide a first sheet of laminate, wherein said cutting provides the laminate sheet with a trailing edge at the cutting line and wherein said cutting provides the lamina supply with a successive leading edge at the cutting line, and wherein there is no wasted lamina between the trailing edge of the laminate sheet and the successive leading edge of the lamina;

(c) bonding the first laminate sheet to a first side of a first card;

(d) repeating step (b) to provide a second sheet of laminate;

(e) bonding the second laminate sheet to a second side of the first card; and (f) following steps (b) through (e) a plurality of times to yield said plurality of laminated cards.

29. The process of claim 28 wherein the step of cutting through a lamina comprises cutting the lamina with a motor driven rotary cutter.

30. The process of claim 29 wherein said rotary cutter comprises:

a fixed cutting blade and a rotating cutting blade, said rotating cutting blade being rotatable from an open position through a cutting position and rotatably returning to said open position; and wherein at said open position, said lamina supply route extends between said fixed cutting blade and said rotating cutting blade; and at said cutting position, said rotating cutting blade cuttingly engages said fixed cutting blade.

31. The process of claim 30, wherein said cutter further comprises a switch, said switch disengaging said cutter after one revolution of said rotating cutting blade.

32. The process of claim 28 wherein the bonding step comprises bonding the entire cut sheet of laminate to the card such that no portion of the cut sheet comprises waste material which is not bonded to the card.

33. The process of claim 28 wherein the bonding steps comprise:

registrably bringing the laminate sheet and the card together; and heating the laminate sheet to bond the sheet to the card.

34. A method of making a laminated substrate, comprising the steps of:

(a) providing first and second webless supplies of lamina from which successive sheets of laminate are cut;

(b) conveying the lamina from the first supply along a lamina supply route until a sensor detects a reference on the lamina;

(c) stopping the conveyance of the lamina along the supply route in response to detecting the reference on the lamina;

(d) after the stopping of the lamina, cutting through the lamina along a cutting line at a predetermined distance from the reference of the lamina in order to provide a first cut laminate sheet;

(e) repeating steps (b)–(d) for the second supply of lamina to provide a second cut laminate sheet;

(f) providing a substrate having a leading edge;

(g) bringing the first and second laminate sheets and the substrate together into registrable contact; and (h) bonding the first laminate sheets to one of a top and a bottom side of the substrate, and bonding the second laminate sheet to the other one of the top and the bottom side of the substrate.

35. The method of claim 34, wherein the bonding step comprises bonding the entire cut sheets of laminate to the substrate such that no portion of the cut sheets comprise waste material which is not bonded to the substrate.

36. The method of claim 34, wherein the bonding step comprises registrably bringing the laminate sheet and substrate together and heating the laminate sheet to bond the sheet to the substrate.

37. A process of making a plurality of laminated cards, comprising the steps of:

(a) providing first and second webless supplies of lamina from which successive plurality of first and second laminate sheets are separated, wherein said lamina has a current leading edge;

(b) providing a lamina supply route along which the first and second laminate sheets are conveyed;

(c) providing a card path;

(d) conveying a card along the substrate path to a convergence zone;

(e) conveying the first laminate sheet from the lamina supply route to the convergence zone and bringing the first sheet into registration with a first side of the card;

(f) conveying the second laminate sheet from the lamina supply route to the convergence zone and bringing the second sheet into registration with a second side of the card;

(g) further conveying a card along the card path through a bonding station, the bonding station positioned along the card path, the bonding station laminating the first and second laminate sheets to the card; and (h) following steps (d) through (g) a plurality of times to yield said plurality of cards.

\* \* \* \* \*